(12) United States Patent
Reichman et al.

(10) Patent No.: US 12,497,591 B2
(45) Date of Patent: Dec. 16, 2025

(54) COMPOSITIONS AND METHODS FOR EFFICIENT AMPLIFICATION OF RETINAL PROGENITORS CELLS

(71) Applicants: SORBONNE UNIVERSITE, Paris (FR); CENTRE NATIONAL DE LA RECHERCHE SCIENTIFIQUE, Paris (FR); INSTITUT NATIONAL DE LA SANTE ET DE LA RECHERCHE MEDICALE (INSERM), Paris (FR)

(72) Inventors: Sacha Reichman, Paris (FR); Olivier Goureau, Paris (FR); José-Alain Sahel, Paris (FR)

(73) Assignees: Sorbonne Universite, Paris (FR); Centre National de la Recherche Scientifique, Paris (FR); Institut National de la Sante et de la Recherche Medicale (INSERM), Paris (FR)

(*) Notice: Subject to any disclaimer, the term of this patent is extended or adjusted under 35 U.S.C. 154(b) by 554 days.

(21) Appl. No.: 16/976,581

(22) PCT Filed: Mar. 6, 2019

(86) PCT No.: PCT/EP2019/055599
§ 371 (c)(1),
(2) Date: Aug. 28, 2020

(87) PCT Pub. No.: WO2019/170766
PCT Pub. Date: Sep. 12, 2019

(65) Prior Publication Data
US 2021/0002607 A1 Jan. 7, 2021

(30) Foreign Application Priority Data
Mar. 7, 2018 (EP) .................................. 18305243

(51) Int. Cl.
*C12N 5/0793* (2010.01)

(52) U.S. Cl.
CPC .......... *C12N 5/062* (2013.01); *C12N 2501/11* (2013.01); *C12N 2501/115* (2013.01); *C12N 2501/33* (2013.01); *C12N 2501/41* (2013.01); *C12N 2501/727* (2013.01); *C12N 2501/998* (2013.01)

(58) Field of Classification Search
CPC .............. C12N 5/062; C12N 2501/11; C12N 2501/115; C12N 2501/33; C12N 2501/41; C12N 2501/727; C12N 2501/998; C12N 2503/02; C12N 2506/45; C12N 5/0623; C12N 5/0621; A61K 35/30
See application file for complete search history.

(56) References Cited

U.S. PATENT DOCUMENTS 9,359,592 B2 * 6/2016 Park ..................... C12N 5/0621
2018/0051248 A1 * 2/2018 McMahon ........... A61K 38/185

FOREIGN PATENT DOCUMENTS

| EP | 2 784 152 A1 | 10/2014 |
| EP | 3 211 071 A1 | 8/2017 |
| WO | 2011/043591 A2 | 4/2011 |
| WO | 2015/054526 A2 | 4/2015 |
| WO | 2016/032263 A1 | 3/2016 |

OTHER PUBLICATIONS

Sholl-Franco, Alfred, et al. "ATP controls cell cycle and induces proliferation in the mouse developing retina." International Journal of Developmental Neuroscience 28.1 (2010): 63-73. (Year: 2010).*
Thermofisher, "Freezing Cells", https://www.thermofisher.com/us/en/home/references/gibco-cell-culture-basics/cell-culture-protocols/freezing-cells.html, accessed by the wayback machine on Jun. 23, 2017 (see top of attached NPL). (Year: 2017).*
Liu, Jing, et al. "Epileptogenesis in organotypic hippocampal cultures has limited dependence on culture medium composition." PloS one 12.2 (2017): e0172677. (Year: 2017).*
Chen, G., et al., "Chemically Defined Conditions for Human iPSC Derivation and Culture," Nature Methods 8(5):424-429, May 2011.
Davis, D.M., et al., "Retinal Progenitor Cells, Differentiation, and Barriers to Cell Cycle Reentry," Current Topics in Developmental Biology 93:175-188, Jan. 2010.
International Search Report mailed Apr. 15, 2019, issued in International Application No. PCT/EP2019/055599, filed Mar. 6, 2019, 5 pages.
Llonch, S., et al., "Organoid Technology for Retinal Repair," Developmental Biology 433(2):132-143 Dec. 2017.
Nakano, T., et al., "Self-Formation of Optic Cups and Storable Stratified Neural Retina From Human ESCs," Cell Stem Cell 10(6):771-785, May 2012.
Reichman, S., et al., "Generation of Storable Retinal Organoids and Retinal Pigmented Epithelium From Adherent Human iPS Cells in Xeno-Free and Feeder-Free Conditions," Stem Cells 35(5):1176-1188, May 2017.
Weed, L.S., et al., "Strategies for Retinal Cell Generation From Human Pluripotent Stem Cells," Stem Cell Investigation 4(65):1-9, 2017.

(Continued)

*Primary Examiner* — Kara D Johnson
*Assistant Examiner* — Constantina E Stavrou
(74) *Attorney, Agent, or Firm* — Christensen O'Connor Johnson Kindness PLLC

(57) ABSTRACT

The disclosure pertains to a defined cell culture medium for the expansion of human retinal progenitors, comprising or consisting of a nutrient medium, a SHH-pathway activator and a GSK3 inhibitor. To the use of the defined cell culture medium for the expansion of retinal progenitors, as well as to an in vitro method for expanding retinal progenitors, comprising: (i) placing a culture of human retinal progenitors in a defined cell culture medium as defined in claims 1 to 8; and (ii) culturing the cells in said defined cell culture medium.

15 Claims, 15 Drawing Sheets

(56) References Cited

OTHER PUBLICATIONS

Figure 1:
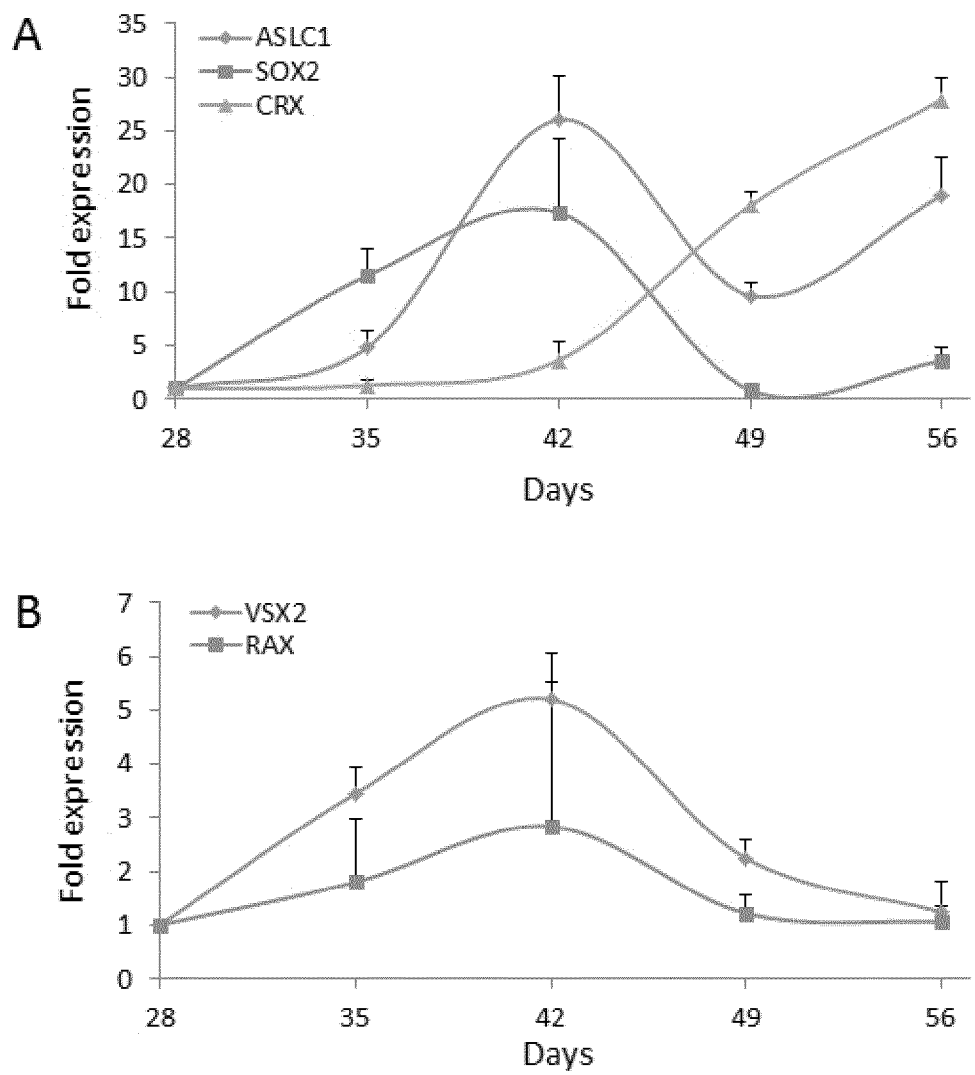

Written Opinion of the International Searching Authority mailed Apr. 15, 2019, issued in International Application No. PCT/EP2019/055599, filed Mar. 6, 2019, 7 pages.

International Preliminary Report on Patentability, mailed Sep. 8, 2020, issued in corresponding International Patent Application No. PCT/EP2019/055599, filed Mar. 6, 2019, 8 pages.

* cited by examiner

COMPOSITIONS AND METHODS FOR EFFICIENT AMPLIFICATION OF RETINAL PROGENITORS CELLS

Retinal degenerative diseases leading to blindness such as age-related macular degeneration (AMD) or glaucoma are characterized by the loss of photoreceptors (PRs) or retinal ganglion cells (RGCs), respectively. Today with the advent of stem cells, therapeutic strategies using cell derivatives of human induced pluripotent stem cells (hiPSCs) are very promising to rescue the degenerated retina.

Indeed, proof of concept studies in mice demonstrated that photoreceptor precursors can integrate into the adult mammalian retina and form mature and functional photoreceptors.

Recent progress in retinal-cell therapy derived from human pluripotent stem cells currently faces technical challenges that require the development of easy and standardized protocols to generate sufficient quantity of appropriate cells.

The inventors previously developed a simple retinal differentiation method, based on adherent human induced pluripotent stem cells (hiPSCs), bypassing embryoid body formation and the use of exogenous molecules, coating, or substrates [1]. In 2017, this method was optimized for its transposition in a current Good Manufacturing Practice (cGMP) condition needed for future clinical use [2]. Thus, with this method, retinal organoids containing retinal progenitor cells (RPCs), can be generated in four weeks. Furthermore, the inventors shown that floating cultures of isolated structures enabled the differentiation of RPCs into all retinal cell types, with the generation of transplantation-compatible CD73$^+$ photoreceptor precursors in less than 100 days [2].

However, one limitation for the translation of these protocols toward clinical development is the difficulty to scale-up the production of potential therapeutic cells.

To overcome this issue, the inventors designed a new culture environment, compatible with cGMP conditions allowing an efficient amplification of human iPS-derived RPCs (hiRPCs or RPCs in the present invention) while retaining their proliferative property and retinal multipotency. Indeed, the inventors further demonstrated that these amplified hiRPCs can be differentiated into retinal cells, such as photoreceptors precursors and retinal ganglion cells (RGCs), useful for future stem cell-based transplantation or high throughput drug screening campaign.

Defined Cell Culture Medium

A first object of the invention is a defined cell culture medium for the expansion of human retinal progenitors, comprising or consisting of a nutrient medium, a SHH-pathway activator and a GSK3 inhibitor.

Preferably, the defined cell culture medium is for maintaining the mitotic capacity and/or retinal multipotency of the retinal progenitors for at least 2, preferably 5, more preferably 10 passages.

As intended herein, the expression "retinal progenitors" or "retinal progenitor cells" (RPCs) relates to cells presenting at least one, and preferably all, of (i) retinal multipotency (ii) the expression of various retinal progenitor markers, (iii) a mitotic capacity.

As used herein, the terms "proliferate", "expand" or "amplify" designate the process that results in an increase of the number of cells.

As used herein, "retinal multipotency" designates the retinal progenitor ability to differentiate into retinal precursor cells or mature retinal cells in defined cell culture conditions. The term "retinal cells" designates all cell types of the neural retina as well as retinal pigment epithelium (RPE). The "neural retinal cells" herein include RGCs, bipolar cells, horizontal cells, amacrine cells, rod and cone photoreceptor cells, Müller glial cells.

As used herein, "retinal progenitor markers" relates to molecular markers aiming at helping retinal progenitor identification, either by checking their expression or the fact that they are not expressed anymore, and/or to quantitatively measure their expression level. Genetic markers can be confirmed by various methods known in the art. For example, expression of molecular markers may be quantified by quantifying marker gene mRNA, for example by the use of qPCR methods. Alternatively, expression of molecular markers may be assessed by quantification of marker gene translation products, for example by immunoassays, for example, immunocytochemistry and immunoblot assays. Retinal progenitor markers are transcription factors associated with eye-field specification during early retinogenesis (retinal identity genes) such as PAX6, VSX2, RAX, LHX2 or SIX3, the first two being preferred. The expression of stemness markers (such as SOX2), neurogenic markers (such as SIX6 or ASCL1) or proliferative markers (such as Ki67) may be used in combination with retinal identity genes to confirm the identification of RPCs.

The term "mitotic capacity" designates the capacity of a cell to proliferate. Ki67 is a marker of proliferative cells as it is present during all active phases of the cell cycle ($G_1$, S, $G_2$, mitosis) but is absent in quiescent cells ($G_0$).

In the context of the invention, the term "feeder-free" refer to a culture devoid of feeder cells. As used herein, the term "feeder cells" encompasses cells unable to divide ("growth-arrested cells") which support undifferentiated growth of human embryonic and induced pluripotent stem cells such as growth-arrested fibroblasts, particularly human foreskin fibroblasts, adult dermal fibroblasts and primary mouse embryonic fibroblasts (MEFs).

A "nutrient medium" refers to an aqueous solution of salts, nutrients and vitamins that can support the growth of animal cells, in particular somatic cells or pluripotent stem cells, in culture. Nutrient media are well known in the art, and may be sorted into minimal nutrient media, which contain the minimum nutrients possible for cell growth, i.e. typically a mixture of amino acids, glucose, salts, and vitamins; and specific nutrient media, which have been developed for specific cell types, and typically comprise the minimum nutrients above, and further compounds which are beneficial for the growth and/or maintenance of the cell type considered. In the context of the invention, it should be understood that a minimum nutrient medium does not contain proteins. In the context of the invention, the term "protein" refers to a polypeptide of at least 50 amino-acids.

Advantageously, the nutrient medium is a minimal nutrient medium. Minimal nutrient media can be selected among others from Dulbecco's modified Eagle's medium (DMEM), Neurobasal® medium (Gibco®). DMEM may also be DMEM/F12 or DMEM high-glucose. DMEM/F-12 can be a 1:1 or 1:3 mix of Dulbecco's modified Eagle medium and Ham's F-12 medium. The nutrient medium may also be a "stem-cell-specific nutrient medium" such as those commercialized as Essential 6™ (E6), Essential 7™ (E7), or Essential 8™ (E8) medium by the company Thermo Fischer Scientific or Proneunal medium as ProB27. ProB27 consists in DMEM/F12, L-Glutamine, 1% of MEM non-essential amino acid, 2% of B27 supplement, 10 units/mL of penicillin and 10 µg/mL of streptomycin (Thermo Fischer Scientific). E8 medium consists in insulin, selenium, transferrin, L-ascorbic acid, FGF2, and TGFβ (or NODAL) in DMEM/F12 with pH adjusted with NaHCO$_3$. More precisely, this medium has been defined in Chen et al. [21] as follows: E8 medium contains DMEM/F12, L-ascorbic acid-2-phosphate magnesium (64 mg/l), sodium selenium (14 μg/l), FGF2 (100 μg/l), insulin (19.4 mg/l), NaHCO$_3$ (543 mg/l) and transferrin (10.7 mg/l), TGFβ1 (2 μg/l) or NODAL (100 μg/l), wherein osmolarity of the medium is adjusted to 340 mOsm at pH7.4.

Stem-cell-specific nutrient media derived from the E8/Essential 8™ medium, such as E7 medium, commercialized as Essential 7™ (Thermo Fischer Scientific) or E6 medium, commercialized as Essential 6™ (Thermo Fischer Scientific), may also be used. E7 medium has a similar composition than that of E8 medium, but does not contain any TGFβ (i.e., is devoid of TGFβ). E7 medium consists in insulin, selenium, transferrin, L-ascorbic acid, FGF2, in DMEM/F12 with pH adjusted with NaHCO$_3$. E6 medium has a similar composition than that of E8 medium, but is devoid of TGFβ and devoid of FGF2. E6 medium consists in insulin, selenium, transferrin, L-ascorbic acid, in DMEM/F12 with pH adjusted with NaHCO$_3$. E6N2 medium consists of Essential 6 with 1% of N2 supplement (Thermo Fischer Scientific), 10 units/mL of penicillin and 10 μg/mL of streptomycin (Thermo Fischer Scientific). Preferably, the stem-cell-specific nutrient medium consists in insulin, selenium, transferrin, L-ascorbic acid, in DMEM/F12 with pH adjusted with NaHCO$_3$, optionally further comprising TGFβ and/or FGF2. The components present in ProB27, E6 and E6N2 media are summarized in table 1.

TABLE 1

Composition of media ProB27, E6 and E6N2.

| | ProB27 | E6 | E6N2 |
|---|---|---|---|
| DMEM F/12 | + | + | + |
| L-Glutamine | + | | |
| MEM non-essential amino acid | + | | |
| B27 supplement | + | | |
| penicillin | + | | + |
| streptomycin | + | | + |
| L-ascorbic acid | | + | + |
| Selenium | | + | + |
| Transferrin | | + | + |
| NaHCO$_3$ | | + | + |
| Insulin | | + | + |
| N2 supplement | | | + |

Commercial stem-cell-specific nutrient media such as TeSR™-E8(STEMCELL Technologies), TeSR™-E7 (STEMCELL Technologies), TeSR™-E6 (STEMCELL Technologies), NutriStem (STEMGENT) and iPS-Brew (Miltyeni) may also be used.

Advantageously, the nutrient medium comprises or consists in DMEM or a stem-cell-specific nutrient medium.

The "Hedgehog signaling pathway" or "SHH pathway" is well known in the art and has been described, for example, by Choudhry et al., [4]. Hedgehog ligands, including, for example, Sonic hedgehog, Indian hedgehog, and/or Desert hedgehog, bind to the receptor, including, for example, Patched or the patched-smoothened receptor complex, which induces a downstream signaling cascade. Downstream target genes of SHH signaling include GLI1, GLI2 and/or GLI3.

An "activator", as used herein, is defined as a compound/molecule enhancing or inducing the activity of a target molecule or a pathway. Accordingly, the term "activator" encompasses both molecules/compounds that have a direct activating effect on the specific pathway but also molecules that are indirectly activating, e.g. by interacting for example with molecules that negatively regulate (e.g. suppress) said pathway. The activator can be an agonist of the pathway to be activated. Methods for testing if a compound/molecule is capable to induce or enhance the activity of a target molecule or pathway are known to the skilled artisan. The compound/molecule that can be used as an activator can be any compound/molecule, which can activate the respective pathway or which inhibits a suppressor of the pathway to be activated. Exemplary activators can include suitable binding proteins directed e.g. against suppressors of a certain pathway. An activator may enhance or increase the pathway to be activated by 10%, 20%, 30%, 40%, 50%, 60%, 70%, 80%, 90%, 100% or more when compared to the activity of the pathway without or before the addition of the activator.

Accordingly, the term "SHH-pathway activator" refers to an activator of any one of the above recited molecules that form part of this signaling pathway. Exemplary activators of the Hedgehog signaling (SHH) include purmorphamine (9-cyclohexyl-N4-(morpholinyl)phenyl]-2-(1-naphthalenyloxy)-9H-purin-6-amine; CAS No.: 483367-10-8), SHH, smoothened agonist (SAG;3-chloro-N-[trans-4-(methylamino)cyclohexyl]-N-[[3-(4-pyridinyl)phenyl]methyl]-benzo[b]thiophene-2-carboxamide; CAS No.: 912545-86-9), and Hh-Ag 1.5 (3-chloro-4,7-difluoro-N-(4-(methylamino)cyclohexyl)-N-(3-(pyridin-4-yl)benzyl) benzo[b]thiophene-2-carboxamide; CAS No.: 612542-14-0) as well as zinc finger protein Gli including Gli1, 2 and 3.

The SHH-pathway activator can also be selected from the group consisting of purmorphamine, SHH, SAG Analog and Gli protein family. The SHH pathway activator can also be a recombinant or truncated form of SHH, which retains SHH pathway activating functions such as e.g. SHH C24II.

The SHH pathway activator such as purmorphamine can be employed at a concentration of between 1 nM and 0.5 μM, preferably, more preferably between 500 nM and 0.5 μM, even more preferably between 100 nM and 0.5 μM, and most preferably, the concentration is between 0.5 and 1.5 μM. The SHH pathway activator such as SHH can also be employed at a concentration of between 50 and 1000 ng/ml. The SHH signaling pathway activator such as SHH C24II can also be employed at a concentration of 10 and 500 ng/ml. The SHH signaling pathway activator such as SAG can be employed at a concentration of 1 and 500 nM. The SHH signaling pathway activator such as Hh-Ag1.5 can also be employed in a concentration of between 1 and 100 nM.

Glycogen synthase kinase-3 (GSK3) is a serine/threonine kinase expressed as two similar isoforms, α and β. A number of variants have been described [5]. GSK3 was initially implicated in insulin signaling and metabolic regulation, but later studies identified additional roles in embryogenesis, mitotic regulation, inflammation, and neuroplasticity. Indeed, GSK3 plays a role in a diverse signaling pathways and cellular functions, contributing to the regulation of apoptosis, cell cycle, cell polarity, and gene expression. Unlike many other protein kinases, which are typically activated by extracellular signaling, GSK-3 is constitutively active in resting conditions and undergoes rapid inhibition by variety of stimuli. Phosphorylation of GSK3 downstream targets typically results in attenuation of the signaling pathway and/or inhibition of the substrate's activity. For example, GSK3 phosphorylates and inhibits glycogen synthase and it inhibits insulin signaling via the phosphorylation of the insulin receptor substrate proteins IRS-1 and IRS-2. On the other hand, GSK3 is also known as a mediator of the canonical Wnt signaling pathway where GSK3 phosphorylates β-catenin, a key target in Wnt pathways, thereby enhancing its proteosomal degradation and suppressing its transcriptional activity.

Accordingly, the term "GSK3 inhibitor" as described herein refers to a molecule capable of binding directly to GSK3 thereby interfering with its catalytic activity. For example, GSK3 inhibitors may be ATP competitive inhibitors chosen from maleimides derivatives such as SB-216763 (3-(2,4-Dichlorophenyl)-4-(1-methyl-1H-indol-3-yl)-1H-pyrrole-2,5-dione, CAS number 280744-09-4) and SB-415286 (3-[(3-Chloro-4-hydroxyphenyl)amino]-4-(2-nitrophenyl)-1H-pyrrole-2,5-dione, CAS number: 264218-23-7), aminopyrimidines such as CHIR-98023 (N'-[4-(2,4-dichlorophenyl)-5-(1H-imidazol-2-yl)pyrimidin-2-yl]-N-(5-nitropyridin-2-yl)ethane-1,2-diamine, CAS number: 252916-76-0) and CHIR99021 (6-[[2-[[4-(2,4-dichlorophenyl)-5-(5-methyl-1H-imidazol-2-yl)-2 pyrimidinyl]amino]ethyl]amino]-3-pyridinecarbonitrile, CAS number: 252917-06-9), or an amino thiazole such as AR-A014418 (1-[(4-methoxyphenyl)methyl]-3-(5-nitro-1,3-thiazol-2-yl)urea, CAS number: 487021-52-3). GSK3 inhibitors may also be GSK3 substrate competitive peptide inhibitors, such as the L803 peptide (CAS number: 348089-28-1) or its myristoylated form L803-mts (CAS number: 1043881-55-5). A GSK3 inhibitor may also be a competitive inhibitor of the GSK3 $Mg^{2+}$ cosubstrate, such as a lithium salt, preferably LiCl.

The GSK3 inhibitor such as CHIR99021 can be employed in a concentration of between 1 and 10 μM, preferably between 1 and 8 μM, more preferably between 2 and 4 μM, most preferably the concentration is of 3 μM.

Preferably, the defined cell culture medium further comprises a pro-neural supplement. The person skilled in the art may easily define the relative proportion of the nutrient medium and of the pro-neural supplement. Preferably, the volume of the pro-neural supplement represents 1% to 2% of the final volume of the defined cell culture medium.

As used herein, a "pro-neural supplement" essentially comprises or consists in a mixture of insulin and transferrin. For example, the pro-neural supplement may be a mixture of BSA, transferrin, insulin, progesterone, putrescine, sodium selenite, biotine, 1-carnitine, cortisone or hydrocortisone, ethanolamine, d(+)galactose, glutathione (reduced), linolenic acid, linoleic acid, retinyl acetate, selenium, T3 (triodo-1-thryonine), dl-α-tocopherol (vitamin E), dl-α-tocopherol acetate, catalase and superoxide dismutase; a mixture of transferrin, insulin, progesterone, putrescine and sodium selenite; a mixture of BSA, transferrin and insulin; or a mixture of transferrin, insulin, sodium selenite, FGF2 and EGF.

Appropriate pro-neural supplements may be chosen among well-known supplements such as N2, B27, G5 and BIT9500 supplements, as well as any supplement derived from these. The components present in these supplements are summarized in Table 2 below.

TABLE 2

Composition of four medium supplements for pro-neural media.

| | B27[a] | N2[b] | BIT9500[c] | G5[d] |
|---|---|---|---|---|
| BSA | + | − | + | − |
| Transferrin | + | + | + | + |
| Insulin | + | + | + | + |
| Progesterone | + | + | − | − |
| Putrescine | + | + | − | − |
| Sodium selenite | + | + | − | + |
| Biotin | + | − | − | − |
| 1-carnitine | + | − | − | − |
| Corticosterone/hydrocortisone | + | − | − | − |
| Ethanolamine | + | − | − | − |
| d(+)-galactose | + | − | − | − |
| Glutathione (reduced) | + | − | − | − |
| Linolenic acid | + | − | − | − |
| Linoleic acid | + | − | − | − |
| Retinyl acetate | + | − | − | − |
| Selenium | + | − | − | − |
| T3 (triodo-1-thyronine) | + | − | − | − |
| dl-α-tocopherol (vitamine E) | + | − | − | − |
| dl-α-tocopherol acetate | + | − | − | − |
| Catalase | + | − | − | − |
| Superoxide dismutase | + | − | − | − |
| FGF2 | − | − | − | + |
| EGF | − | − | − | + |

[a]See Brewer et al., 1993[3];
[b]Provided by manufacturer (Gibco BRL, Germany);
[c]Provided by manufacturer (StemCell Technologies Inc., Canada);
[d]Provided by manufacturer (Life Technologies, USA).

Preferably, the "defined cell culture medium" further comprises animal-derived products such as serum albumin (purified from blood), hydrolysates, growth factors, hormones, carrier proteins, and attachment factors.

Preferably, the "defined cell culture medium" is serum-free, that is to say, in the context of the invention, it does not contain serum obtained from an animal source, such as fetal bovine serum (FBS).

Preferably, the "defined cell culture medium" is xeno-free, that is to say, in the context of the invention, that all proteins of the defined cell culture medium are derived from human origin. According to a yet preferred embodiment, the defined cell culture medium is formulated with only recombinant or humanized components. In the context of the invention, it should be understood that this definition encompasses both components, more particularly proteins, isolated from human samples and recombinant human components, such as recombinant proteins. When recombinant human proteins are used, they may be produced in organisms other than human cells, provided the nucleic acid sequence used is of human origin, or derived from a sequence of human origin.

Advantageously, the defined cell culture medium may comprise ATP, preferably at a concentration of between 5 and 500 μM, more preferably of between 50 and 150 μM, even more preferably between 90 and 110 μM, most preferably the concentration is 100 μm.

As described in the experimental part, and although this is not compulsory, the defined cell culture medium may also comprises epidermal growth factor (EGF) and/or fibroblast growth factor 2 (FGF2). Such defined cell culture media are more effective to expand retinal progenitors, while still achieving the maintenance of mitotic capacity and retinal multipotency in expanded retinal progenitors. In a preferred embodiment, EGF is added at a concentration of between 50 and 200 ng/ml, preferably between 75 and 15 ng/ml, even more preferably between 90 and 110 ng/ml, most preferably the concentration is 100 ng/ml. In a preferred embodiment, FGF2 is added at a concentration of between 5 and 20 ng/ml, preferably between 7.5 and 15 ng/ml, even more preferably between 9 and 11 ng/ml, most preferably the concentration is 10 ng/ml.

Advantageously, the defined cell culture medium comprises or consists of a nutrient medium, preferably DMEM-F12, a SSH-pathway activator and a GSK3 inhibitor (preferably purmorphamine and CHIR99021), and a pro-neural supplement, wherein the pro-neural supplement is a mixture comprising insulin and transferrin chosen in the list consisting of:
- a mixture of BSA, transferrin, insulin, progesterone, putrescine, sodium selenite, biotine, l-carnitine, cortisone or, hydrocortisone, ethanolamine, d(+)galactose, glutathione (reduced), linolenic acid, linoleic acid, retinyl acetate, selenium, T3 (triodo-1-thryonine), dl-α-tocopherol (vitamin E), dl-α-tocopherol acetate, catalase and superoxide dismutase;
- a mixture of transferrin, insulin, progesterone, putrescine and sodium selenite;
- a mixture of BSA, transferrin and insulin; or
- a mixture of transferrin, insulin, sodium selenite, FGF2 and EGF.

Advantageously, the defined cell culture medium does not contain other factors than a SHH-activator and a GSK3 inhibitor. According to a preferred embodiment, the defined cell culture medium is devoid of a molecule inhibitor of notch signaling such as DAPT. Advantageously, the defined cell culture medium is devoid of a molecule inhibitor of TGF-β/BMP, preferably of a molecule inhibitor of the transforming growth factor-beta (TGF-β) superfamily type I activin receptor-like kinases ALK-4, ALK-5, and ALK-7 such as SB431542. Advantageously, the defined cell culture medium is devoid of a molecule inhibitor of Wnt signaling such as Inhibitor of Wnt Production 2 (IWP2) or Dkk1. Advantageously, the defined cell culture medium is devoid of human Leukemia inhibitory factor.

Medium Supplement

In another aspect, the present invention relates to a medium supplement comprising a SHH-pathway activator, a GSK3 inhibitor and ATP. Preferably, said medium supplement further comprises at least one compound selected among EGF and FGF2, more preferably said medium supplement further comprises both compounds, EGF and FGF2. This medium supplement allows to obtain RPCs with a multipotency property with a mitotic ability. As shown in examples, the expression of marker genes RAX, VSX2, LHX2, PAX6 and ASCL1 indicates the maintenance of multipotency and the expression of Ki67 indicates the maintenance of proliferative ability.

Kit

Another subject of the invention is a kit comprising a nutrient medium and a medium supplement comprising at least a SHH-pathway activator, a GSK3 inhibitor and ATP. Preferably, said medium supplement further comprises at least one compound selected among EGF and FGF2, more preferably said medium supplement further comprises both compounds, EGF and FGF2.

According to another aspect, the present invention relates to the use of a supplement medium for maintaining the multipotency and the mitotic ability of retinal progenitors, said supplement medium comprising at least a SHH-pathway activator, a GSK3 inhibitor and ATP. Preferably said medium supplement further comprises at least one compound selected among EGF and FGF2, more preferably said medium supplement further comprises both compounds, EGF and FGF2.

In a preferred embodiment of the invention, the SHH-pathway activator is purmorphamine and or the GSK3 inhibitor is CHIR99021.

As used herein, the term "Supplement 5" (or "S5") designates a supplement comprising five compounds: purmorphamine, CHIR99021, FGF2, EGF and ATP.

According to an embodiment of the invention, the defined cell culture medium according to the invention comprises ProB27 as a nutrient medium and S5; this cell culture medium is called K+.

According to another embodiment of the invention, the defined cell culture medium according to the invention comprises E6 medium as a nutrient medium and S5; this cell culture medium is called E6+S5.

The components present in ProB27, E6 medium, K, K+ and E6+S5 are summarized in table 3.

TABLE 3

Composition of media K, K+ and E6 + S5.

| | ProB27 | E6 | K | K+ | E6 + S5 |
|---|---|---|---|---|---|
| ProB27 | + | | + | + | |
| E6 | | + | | | + |
| Purmorphamine (1 μm) (Selleckchem) | | | + | + | + |
| CHIR99021 (3 μM) (MedChem Express) | | | + | + | + |
| FGF2(1 μM) (Preprotech) | | | | + | + |
| EGF(1 μM) (Preprotech) | | | | + | + |
| ATP (100 μM) | | | + | + | + |

Using the cell culture media of the invention, such as K, K+ or E6+S5, RPCs can be isolated, amplified from hiPSC and maintain multipotency property and mitotic ability.

The invention allows to obtain a large number of multipotent cells. This large number of cells can be used directly or stored for a future use.

Advantageously, RPCs are amplified in floating conditions, for example in K, K+, ProB27+S5 or E6+S5 media or a medium comprising any other nutrient medium with S5 or in adherent conditions. Non-limitative examples of surfaces which can be used for this adherent culture are: glass, plastic (possibly treated), collagen, laminin, fibronectin, Matrigel™, Geltrex™, CellStart™, poly-L-lysin, feeder-cells, or any synthetic surface commercially available such as Corning Synthemax™. After amplification, RPCs can be cryopreserved in the cell culture medium according to the invention with DMSO, such as the amplification medium E6+S5 containing 10% DMSO (Dimethylsulfoxide) or in a specific cryopreservation media such as CryoStem®. Indeed, after thawing, the five compounds (purmorphamine, CHIR99021, FGF2, EGF and ATP) maintain the mitotic ability of RPCs (example 3). Moreover, RPCs thawed keep their multipotency property since they maintain the expression of the RPC genes RAX, PAX6, VSX2, SIX6, SOX2 and ASCL1, while CRX is maintained at low level (example 3).

Another aspect of the invention relates to cryopreserved RPCs in presence of the cell culture medium of the invention, preferably in E6+S5 medium.

Thus, using the cell culture medium of the invention, the inventors have succeeded to obtain a sufficient number of RPCs allowing their storage by cryopreservation. Advantageously, cryopreserved RPCs are viable.

Preferably, the number of cryopreserved RPCs is at a concentration of at least $1 \cdot 10^6$ cells/250 μL of the cell culture medium of the invention with DMSO, such as the amplification medium E6+S5 containing 10% DMSO (Dimethylsulfoxide) or in a specific cryopreservation media such as CryoStem®

Methods

The present invention also pertains to the use of a defined cell culture medium as defined above for the expansion of human retinal progenitors.

According to another aspect, the present invention relates to an in vitro method for expanding human retinal progenitors, comprising:
  (i) placing a culture comprising human retinal progenitors in a defined cell culture medium of the invention; and
  (ii) culturing the cells in said defined cell culture medium.

In the context of the invention, the terms "human retinal progenitors" should be construed as defined above. Such cells may easily be obtained by the person skilled in the art, using methods known in the art. As described in the experimental part, human retinal progenitors may be derived from human pluripotent stem cells. Methods for obtaining human retinal progenitors in vitro have been described in WO 2014/174492 and Reichman et al. (2017) [2]. Briefly, said methods comprise the steps of: ($i_{PS}$) placing an adherent culture of human pluripotent stem cells into a pro-neural medium; ($ii_{PS}$) maintaining this culture in said pro-neural medium until the appearance of neuroepithelial-like structures. In the context of the invention, a "pro-neural medium" designates a medium which comprises a nutrient medium and a pro-neural supplement, as defined above. It is well known that human retinal progenitors are cells which do not significantly express photoreceptors-related genes such as CRX, and which express transcription factors associated with eye-field specification, which can be measured by any known technique, such as qRT-PCR or immunostaining. Advantageously, the skilled artisan can chose to define the end of step ($ii_{PS}$) as the time when the cultured cells express the photoreceptor marker CRX with a fold change of at most 1, 2, 3, 4, 5, 6 or 7 relative to the human pluripotent cells from which it has been differentiated and at the same time express the retinal identity marker VSX2 with a fold change of at least 2 or 3, and/or the stemness marker SOX2 with a fold change of at least 10, 11, 12, 13, 14 or 15, and/or the neurogenic marker such as ASCL1 with a fold change of at least 15, 16, 17, 18, 19 or 20, said fold change being relative to the human pluripotent cells or culture from which it has been differentiated. Advantageously, the human retinal progenitors are obtained by dissociation of neuroepithelial-like structures obtained between day 28 and 49 and more preferably at day 42.

A "fold change" as used herein is a measure describing how much a quantity changes going from an initial to a final value. For example, an initial value of 30 and a final value of 60 corresponds to a fold change of 2 or in common terms a two-fold increase. Fold change is calculated simply as the ratio of the final value of the final value to the initial value, i.e. if the initial value is A and final value is B, the fold change is B/A. The fold change can be obtained with respect to mRNA levels of the markers such as described herein. Such fold changes may be measured using RT-qPCR.

Advantageously, in the method for expanding retinal progenitors, the culture of human retinal progenitors is adherent. Non-limitative examples of surfaces which can be used for this culture are: glass, plastic (possibly treated), collagen, laminin, fibronectin, Matrigel™, Geltrex™, CellStart™, poly-L-lysin, feeder-cells, or any synthetic surface commercially available such as Corning Synthemax™. Advantageously, the adherent culture of the above method is feeder-free. Advantageously, the adherent culture of the above method is in the form of a monolayer reaching at least 80% confluence. The skilled artisan is familiar with the notion of confluence for adherent cells, and will be able to evaluate this confluence, which can be appreciated locally, i.e., only in one area of the recipient, especially if the confluence is non homogeneous on the whole culture surface.

Preferably, the culture in step (ii) is maintained for a time sufficient to expand the cells in the culture, preferably during at least 5 days to 15 days, and more particularly between 7 to 20 days. In a preferred embodiment of the method for expanding retinal progenitors according to the invention, the retinal progenitors are passaged at least once, more preferably from at least once to at least 30 times, or at least 2, 3, 4, 5, 6, 7, 8, 9, 10, 15, 20, 25, 30, 35, 40, 50, 60, or 70 times. Passaging cells is a technique well known to one of skill in the art and may notably be defined as taking one or more cells from a cell culture and transferring the one or more cells into fresh cell culture medium, i.e. a cell culture medium which has not been used for cultivating cells. The culture duration between two passages can be easily defined by one of skill in the art depending on the type of cells to be cultured; the duration should preferably of a length sufficient to allow the cultured cells to divide, while not being so long as the cell culture medium to become unable to sustain optimal growth or multiplication of the cultured cells, or the cultured cells to become senescent, for example. Preferably, the culture duration between two consecutive passages is of at least 5 days more preferably at least 6, 7, 8, 9, 10, 11, 12, 13, 14, or 15 days and most preferably of about 7 days.

As mentioned above, the defined cell culture medium according to the invention not only expands the human retinal progenitor cells, but also maintains their mitotic capacity and/or retinal multipotency property. In other words, the expanded retinal progenitors present retinal mitotic capacity and/or retinal multipotency property.

Preferably, in the method of the invention, cells obtained from step (ii) are competent to differentiate into retinal pigmented epithelium (RPE) as well as neural retinal cells such as photoreceptors and retinal ganglion cells.

Advantageously, in the method for expanding retinal progenitors, cells obtained from step (ii) have retained their mitotic capacity and/or retinal multipotency property.

Of course, when performing the methods according to the present invention, the skilled artisan can check the maintenance of mitotic capacity and/or retinal multipotency property of the cells by checking expression of the corresponding markers (to check either their expression or the fact that they are not expressed anymore, and/or to quantitatively measure their expression level). Any technique known in the art can be used to this aim, such as, for example, quantitative RT-PCR and immunoassays. Preferably, the retinal multipotency property of the cells obtained in step (ii) can be confirmed by detecting the coexpression of the neurogenic marker ASCL1 and of at least one retinal identity marker such as RAX, PAX6, VSX2, SIX3 or LHX2 (the two first ones being preferred).

Advantageously, after step (ii) at least 60%, 70%, 80% or 90% of the cells in the culture are multipotent and/or express one, two, three or all of RAX, PAX6, VSX2, SIX3, LHX2 or ASCL1. Maintenance of proliferative ability may be checked by detecting the expression of the Ki67 marker.

Preferably, in the context of the invention, the cells obtained from step (ii) will be considered as having retained their mitotic capacity when at least 60%, 70%, 80% or 90% of the cells in the culture express the Ki67 marker.

Preferably, in the context of the invention, the cells obtained from step (ii) will be considered as having retained their retinal multipotency property when the expression level of the photoreceptor marker CRX and/or the retinal identity marker VSX2, with respect to mRNA levels, in the population of cells is similar to the expression level of CRX and/or the retinal identity marker VSX2 in the initial population of human retinal progenitors from which it has been expanded.

In the context of the invention, the expression level of the photoreceptor marker CRX will be considered as similar if the ratio of the expression level of the photoreceptor marker CRX in the cells obtained from step (ii) over the expression level of the photoreceptor marker CRX in the initial population of human retinal progenitors is of between 1.6 and 0.6, preferably of between 1 and 0.6. In the context of the invention, the expression level of the photoreceptor marker VSX2 will be considered as similar if the ratio of the expression level of the photoreceptor marker VSX2 in the cells obtained from step (ii) over the expression level of the photoreceptor marker VSX2 in the initial population of human retinal progenitors is of between 1 and 8, preferably of between 1 and 6.

Advantageously, the skilled artisan can chose to define the end of step (ii) as the time when the cultured cells express the photoreceptor marker CRX with a fold change comprised between 1 and at least 0.1, 0.2, 0.3, 0.4, 0.5 or 0.6, relative to the human retinal progenitors from which it has been expanded and/or the retinal identity marker VSX2 with a fold change superior or equal to 1 and of at most 1.1, 1.2, 1.3, 1.4, 1.5, 2, 3, 4, 5, relative to the human retinal progenitors from which it has been expanded.

Advantageously, the retinal progenitors obtained from step (ii) of the method or use of the present invention express a retinal identity marker such as VSX2 with a fold change of at most 1.0, 1.1, 1.3, 1.4, 1.5, 1.6, 1.7, 1.8, 1.9, 2, 2.2, 2.5, 2.7, 3, 3.3, 3.5, 3.7, 4, 5, 6, or 8 relative to the retinal progenitor cell or culture from which it has been expanded. The retinal progenitors obtained from step (ii) can express a retinal marker such as VSX2 with a fold change comprised between 1 and 8, 1 and 7, 1 and 6, 1 and 5, 1 and 4, 1 and 3 or 1 and 2, relative to the retinal progenitor cell or culture from which it has been expanded.

Advantageously, the retinal progenitors obtained by a method or use of the present invention express a photoreceptor marker such as CRX with a fold change inferior or equal to 1 and of at least 0.99, 0.97, 0.98, 0.97, 0.96, 0.95, 0.94, 0.93, 0.92, 0.91, 0.90, 0.87, 0.85, 0.82, 0.8, 0.6, relative to the retinal progenitor cell or culture from which it has been expanded. The so expanded retinal progenitors can express a photoreceptor marker such as CRX with a fold change comprised between 1 and 0.5, preferably relative to the retinal progenitor cell or culture from which it has been expanded.

According to another aspect, the present invention pertains to a method for obtaining photoreceptors or precursors thereof, wherein said method comprises the steps of:
(i) placing a culture of human retinal progenitors into a defined cell culture medium of the invention;
(ii) culturing the cells in said defined cell culture medium; and
(iii$_{PR}$) culturing the cells obtained in step (ii) in a pro-neural medium, optionally further comprising DAPT.

In this embodiment, the pro-neural medium preferably comprises or consists in a pro-neural supplement consisting of a mixture of BSA, transferrin, insulin, progesterone, putrescine, sodium selenite, biotine, 1-carnitine, cortisone or hydrocortisone, ethanolamine, d(+)galactose, glutathione (reduced), linolenic acid, linoleic acid, retinyl acetate, selenium, T3 (triodo-1-thryonine), dl-α-tocopherol (vitamin E), dl-α-tocopherol acetate, catalase and superoxide dismutase in a nutrient medium (e.g. DMEM-F12). More preferably, the volume of pro-neural supplement represents 2% of the final volume of the pro-neural medium. Advantageously, the cells are maintained in step (iii$_{PR}$) during at least 5 days, preferably at least 7 days. In a preferred embodiment, the pro-neural medium is supplemented with DAPT. DAPT (CAS number 208255-80-5) is a γ-secretase inhibitor and indirectly an inhibitor of Notch. Photoreceptors or precursors are cells which significantly coexpress CRX and RECOVERIN. This characterization can be performed by any known technique, such as qRT-PCR or immunostaining.

According to another aspect, the present invention pertains to a method for obtaining retinal ganglion cells, wherein said method comprises the steps of:
(i) placing a culture of human retinal progenitors into a defined cell culture medium of the invention;
(ii) culturing the cells in said defined cell culture medium; and
(iii$_{RG}$) culturing the cells obtained in step (ii) in a pro-neural medium;
(iv$_{RG}$) culturing the cells obtained in step (iii$_{RG}$) in a pro-neural medium further comprising DAPT.

Figure 9:
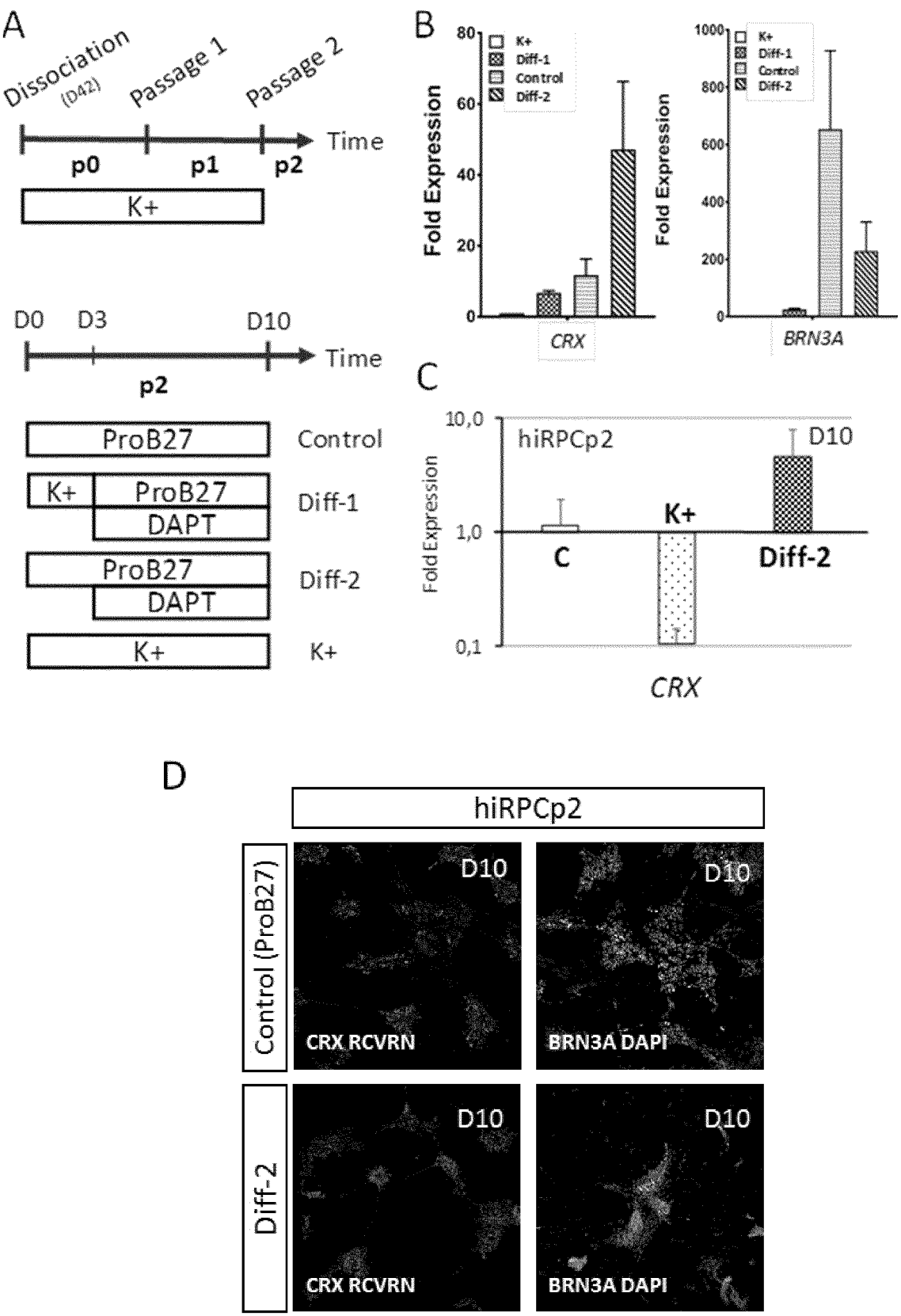

The inventors have shown that culturing retinal progenitors in a pro-neural medium during a few days in step (iii$_{RG}$) before culturing them in a pro-neural medium supplemented with DAPT favors the generation of retinal ganglions cells (see Example 1.2 and FIG. 9). Advantageously, the cells are maintained in step (iii$_{RG}$) during at least 1 day, preferably at least 3 days. Advantageously, the cells are maintained in step (iv$_{RG}$) during at least 3 days, preferably at least 7 days. In this embodiment, the pro-neural medium preferably comprises or consists in a pro-neural supplement consisting of a mixture of BSA, transferrin, insulin, progesterone, putrescine, sodium selenite, biotine, 1-carnitine, cortisone or hydrocortisone, ethanolamine, d(+)galactose, glutathione (reduced), linolenic acid, linoleic acid, retinyl acetate, selenium, T3 (triodo-1-thryonine), dl-α-tocopherol (vitamin E), dl-α-tocopherol acetate, catalase and superoxide dismutase in a nutrient medium (e.g. DMEM-F12). More preferably, the volume of pro-neural supplement represents 2% of the final volume of the pro-neural medium. Advantageously, the cells are maintained in step (iii$_{PR}$) during at least 5 days, preferably at least 7 days. Retinal ganglion cells are cells which significantly express BRN3A. This characterization can be performed by any known technique, such as qRT-PCR or immunostaining.

Advantageously, all the culture methods described above, including methods for obtaining human retinal progenitors, photoreceptor precursors or retinal ganglion cells are adherent culture, and may be conducted in feeder-free conditions.

FIGURE LEGENDS

FIG. 1: Identification of RPCs in human iPSC derived retinal organoids by qRT-PCR. (A, B) Evolution of retinal progenitor markers expression of RAX, VSX2, SOX2, PAX6, ASCL1 and CRX in retinal organoid. A pic expression of the retinal progenitor specific markers was observed at day 42.

Figure 2:
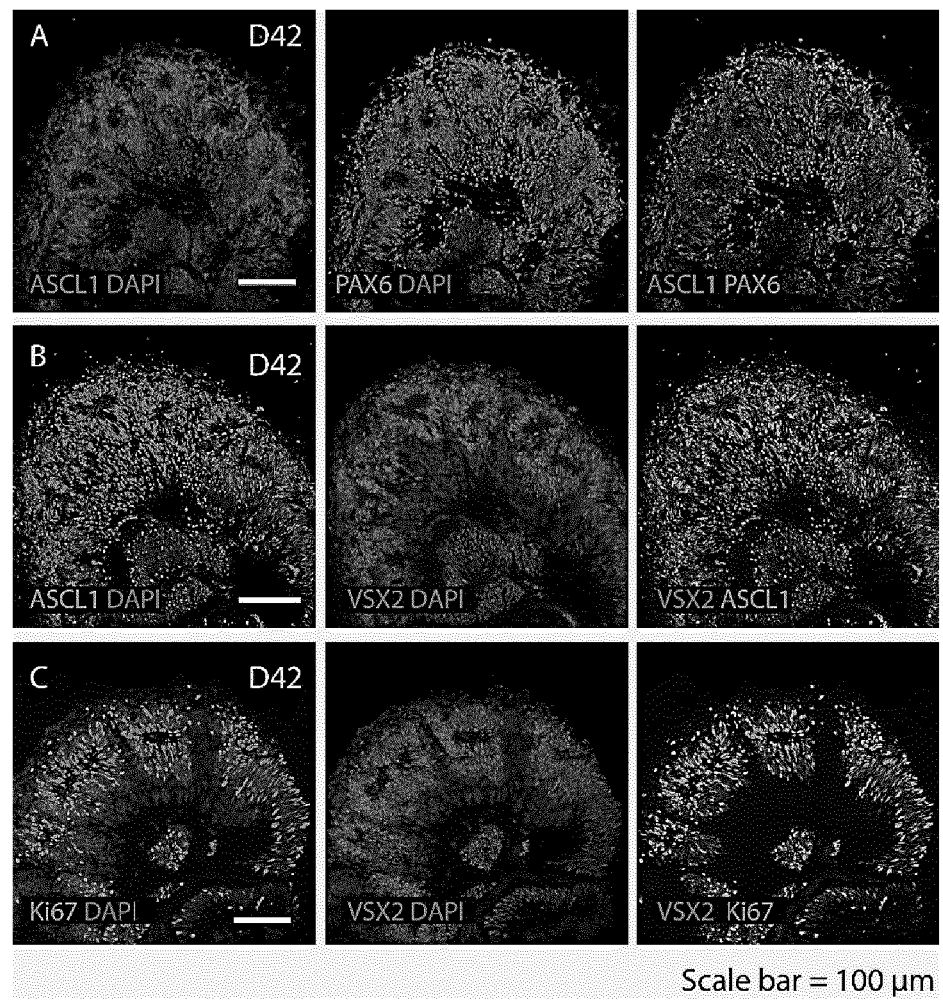

FIG. 2: Identification of RPCs in human iPSC-derived retinal organoids by immunoassay. (A, B) RPC population can be clearly identified in rosettes at day 42 by the cells coexpressing PAX6 and ASCL1 (A) and ASCL1 and VSX2

(B). (C) The mitotic capacity of RPCs was confirmed by the expression of Ki67 in VSX2+ cells.

Figure 3:
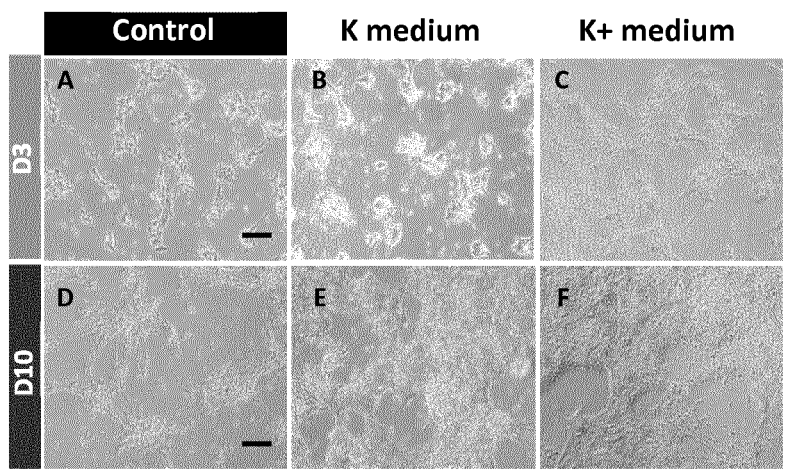

FIG. 3: Bright field micrographs of hiRPCs at D3 and D10. Culture of retinal cells from D42-old dissociated organoids in ProB27 medium (A and D), (K medium (B and E) or in K+ medium (C and F). K and K+ medium sustained proliferation compared to control condition in ProB27. Scale bars=100 μm.

Figure 4:
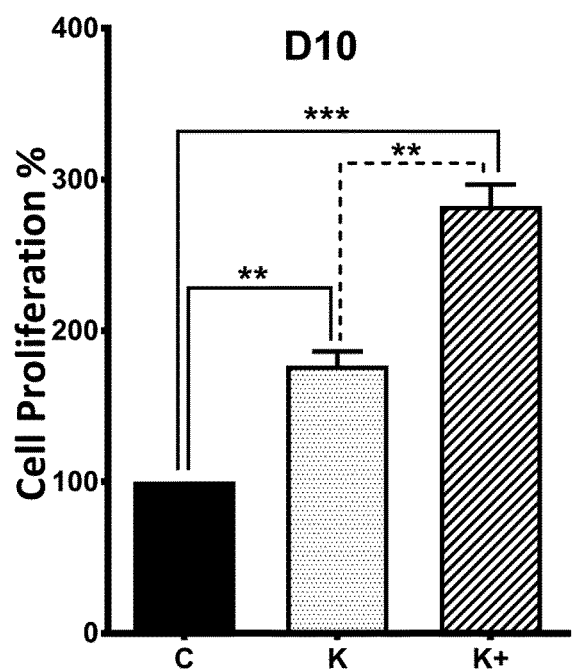

FIG. 4: K and K+ medium effect on adherent hiRPC proliferation at passage 0. At D10 post dissociation, K and K+ medium increase the cell number respectively by two and three fold compared to control condition in ProB27 (C). (p<0.005, *p<0.0005).

Figure 5:
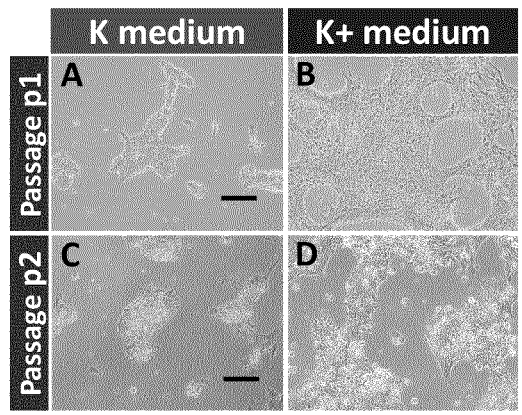

FIG. 5: Bright field micrographs of hiRPCp1 and hiRPCp2 at D6. Culture of hiRPCp1 and hiRPCp2 in K medium (A, C) or in K+ medium (B, D). Progenitors show sustained proliferation after 2 passages. Scale bars=100 μm.

Figure 6:
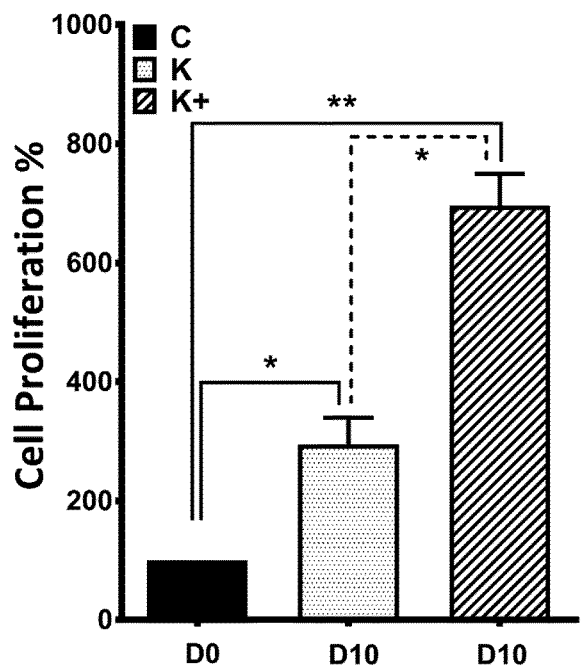

FIG. 6: K and K+ medium effect on hiRPC proliferation at passage 1. The cell number was multiplied by 4 and 7 fold using respectively K and K+ medium after 10 days of culture.

Figure 7:
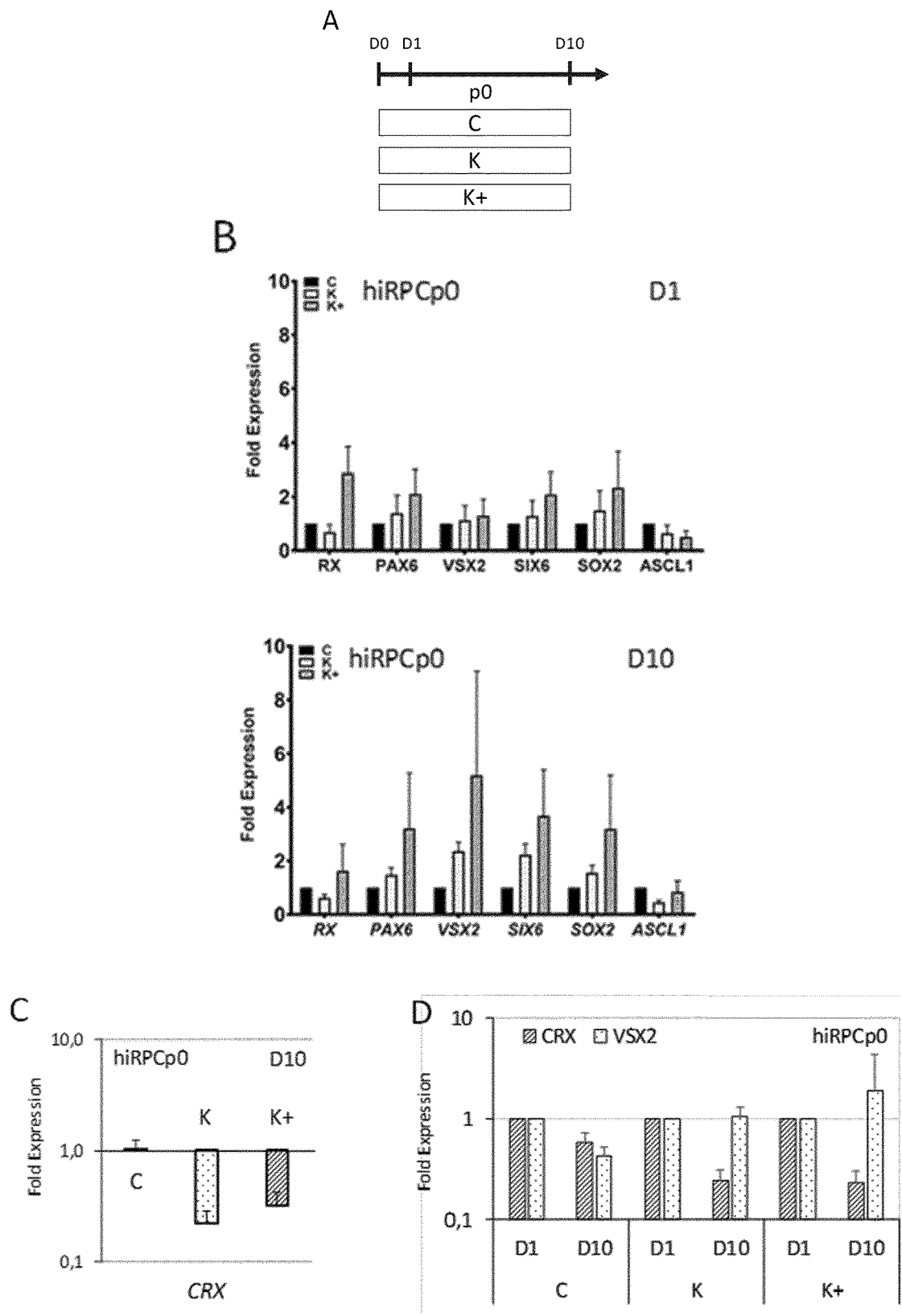

FIG. 7: Expression profile of key genes of multipotency and photoreceptor differentiation in hiRPCs at passage 0. The expression of RPC key genes such as RAX, PAX6, VSX2, SIX6, SOX2 is higher in K and K+ culture conditions compared to control. (A) Schematic diagram illustrating culture condition. (B) Maintenance and Reinforcement of RPC identity at D1 and D10 post-dissociation. (C). Expression of CRX in hiRPCp0 in K and K+ medium condition culture relative to ProB27 (Control, c) at D10. CRX is maintained at low level in K and K+ media comparing to control, showing the non-engagement of hiRPCs in differentiation. (D). qRT-PCR expression profile of CRX and VSX2 in hiRPCp0 in ProB27 (control,c), K or K+ culture condition normalized to their expression at D1.

Figure 8:
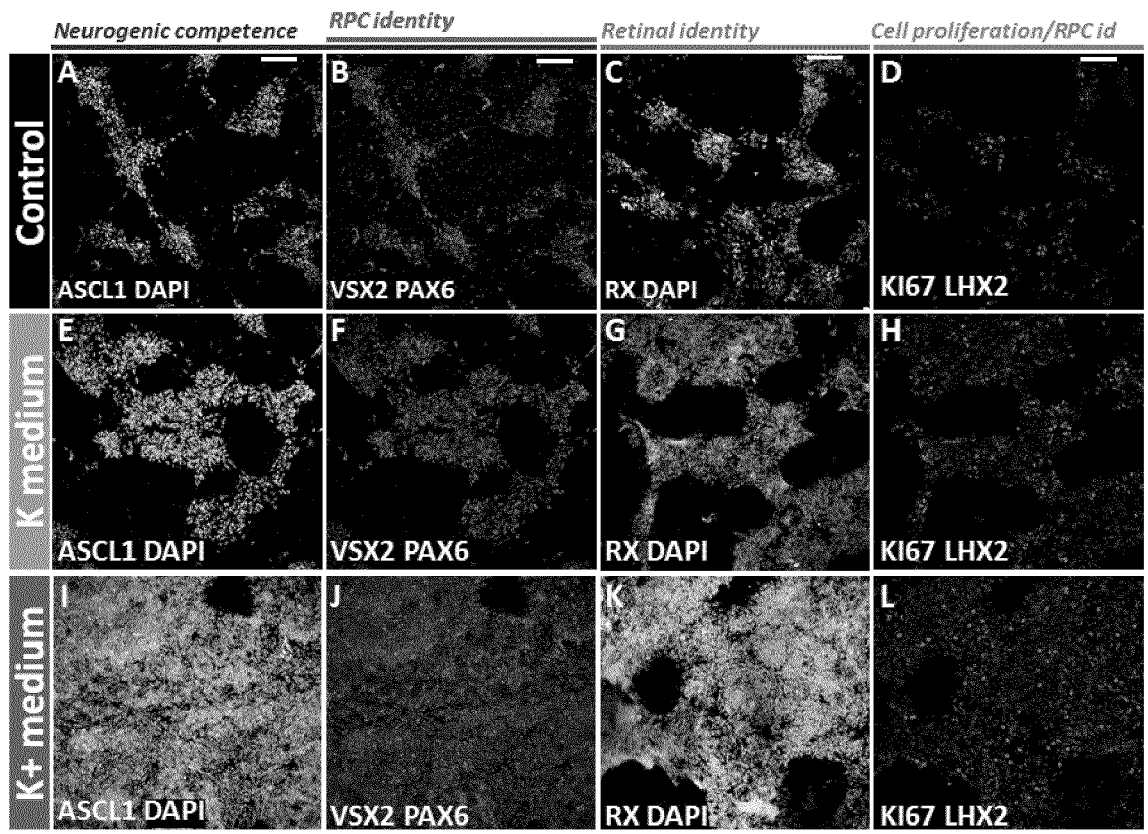

FIG. 8: Immunofluorescence staining of hiRPCp0 at D10 for PAX6, RAX, ASCL1, VSX2, LHX2 and Ki67. Maintenance of multipotency property in expanded hiRPCs is confirmed by coexpression of the neurogenic marker ASCL1 and the retinal progenitor markers PAX6 and VSX2 in both K and K+ culture condition (E, F, J and I) while retaining retinal identity by the expression of RAX and LHX2 (G, H, K and L) and proliferative ability shown by the Ki67 marker (H, L). Scale bars=100 μm.

FIG. 9: Differentiation ability of the hiRPCs expanded in K+ medium after two passages. (A) Schematic diagram illustrating culture condition to amplify RPCs in K+ medium during two passages followed by a spontaneous differentiation in ProB27 medium (control), an early forced differentiation (Diff-1) or a late forced differentiation (Diff-2) using the Notch inhibitor DAPT in order to accelerate photoreceptor commitment. (B) qRT-PCR analysis of CRX (photoreceptors marker) and BRN3A (RGCs marker) expression in hiRPC at passage 2 (hiRPCp2) in the different culture condition at D10. A Diff-2 condition favors the hiRPCs differentiation in photoreceptor precursors, while a control condition favors the hiRPCs differentiation in RGCs. (C) qRT-PCR expression profile of CRX at D10 between control (ProB27 medium), K+ and Diff-2 culture condition. (D) Immunohistochemestry on differenciated hiRPCp2 at D10. Photoreceptor precursors can be identified by the coexpression of CRX and RECOVERIN (RCVRN) and RGCs by BRN3A. Scale bars=100 μm.

Figure 10:
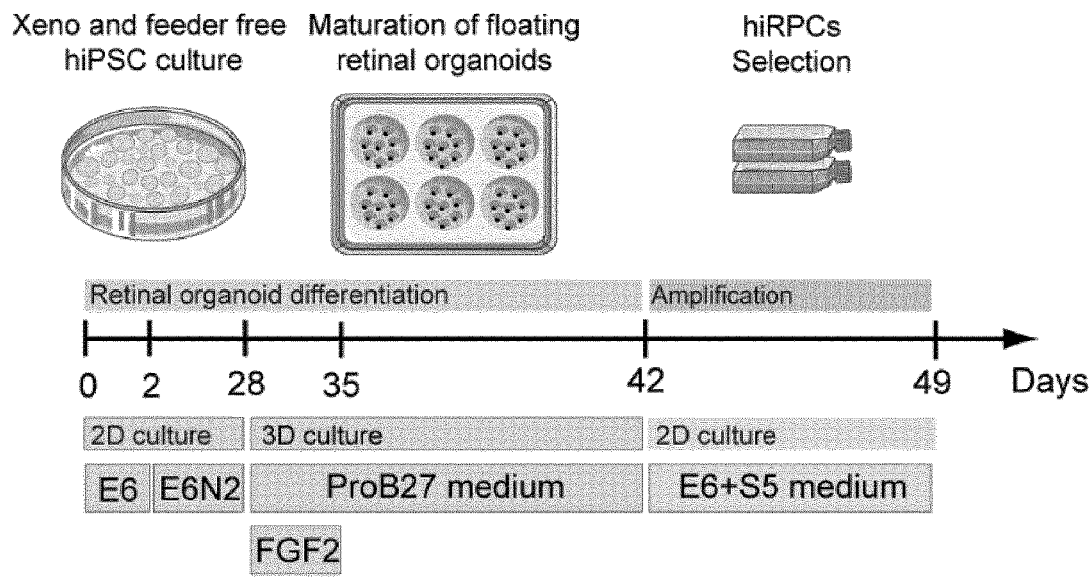

FIG. 10: Diagram showing the different steps to generate retinal organoids and to select RPCs from organoids at D42.

Figure 11:
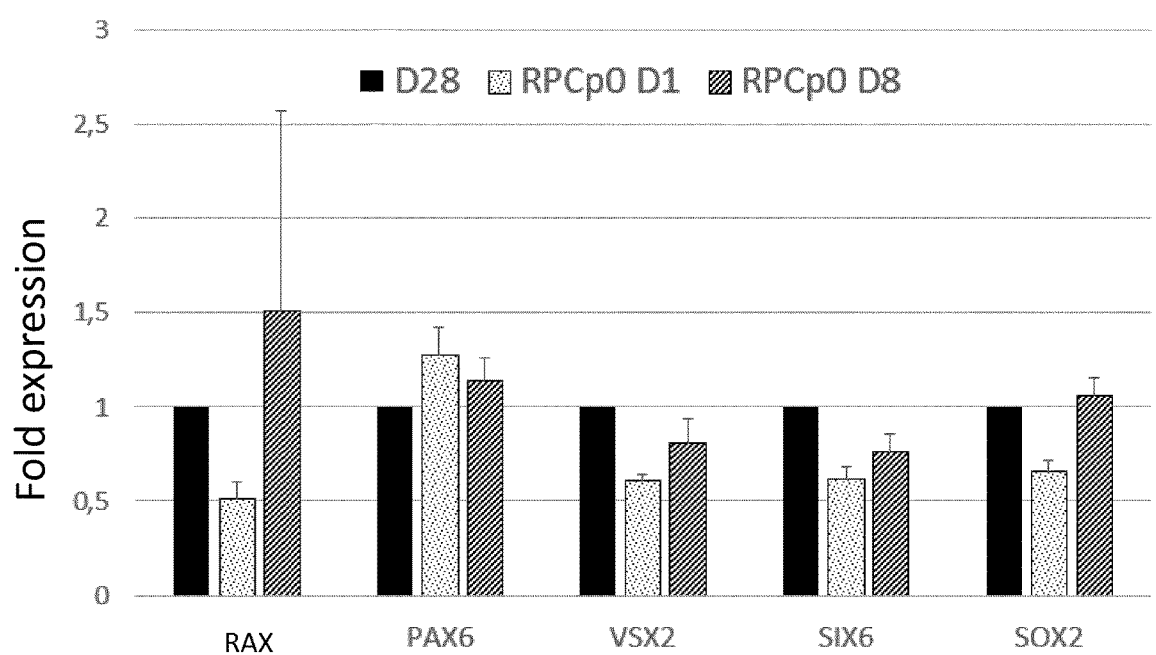

FIG. 11: qRT-PCR analysis of specifics RPC genes in RPCp0 after 1 or 8 days in culture using E6+S5 medium. Results normalized to organoids at D28.

Figure 12:
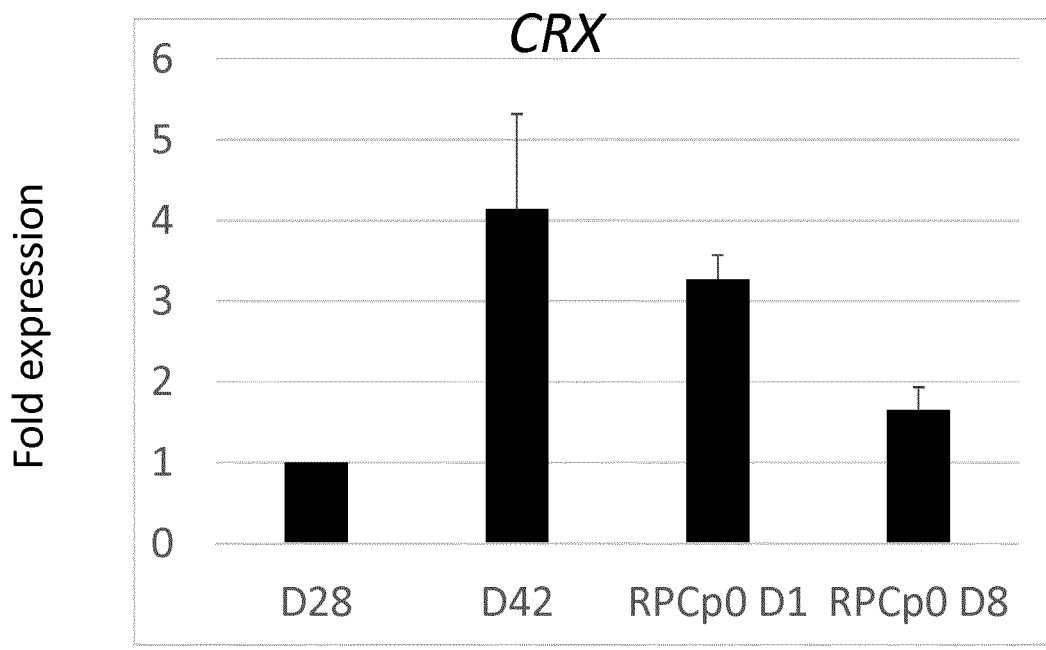

FIG. 12: qRT-PCR analysis of CRX expression in organoids at D28 or D42 and in the extended RPCp0 at D1 or D8 in E6+S5 medium.

Figure 13:
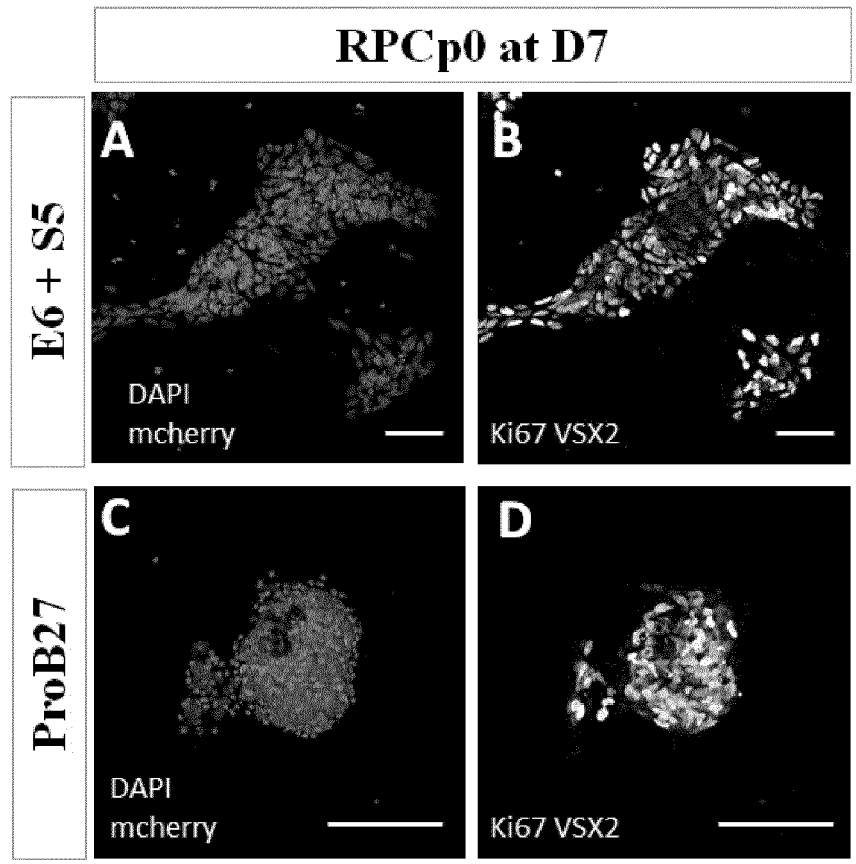

FIG. 13: Immunochemistry analysis of RPCp0 in E6+S5 medium or in a differentiated medium ProB27 after 7 days in culture. mCherry staining represents the expression of CRX (use of the fluorescent reporter cell line already described in [16]). Scale bar: 100 μm.

Figure 14:
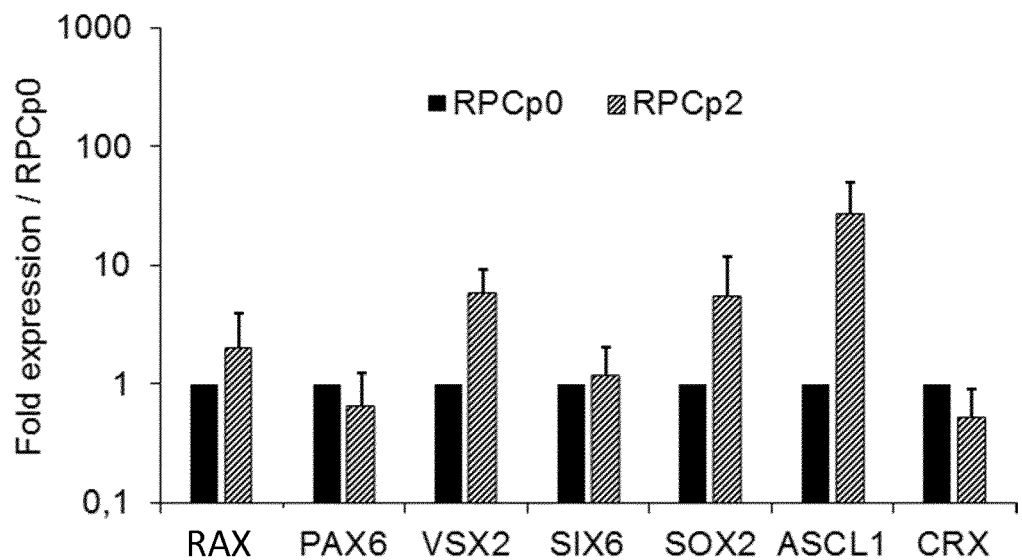

FIG. 14: qRT-PCR analysis of RAX, PAX6, VSX2, SIX6, SOX2, ASCU and CRX in RPCp0 and p2 at D7 cultivated in E6+S5. The results were normalized to RPCp0.

Figure 15:
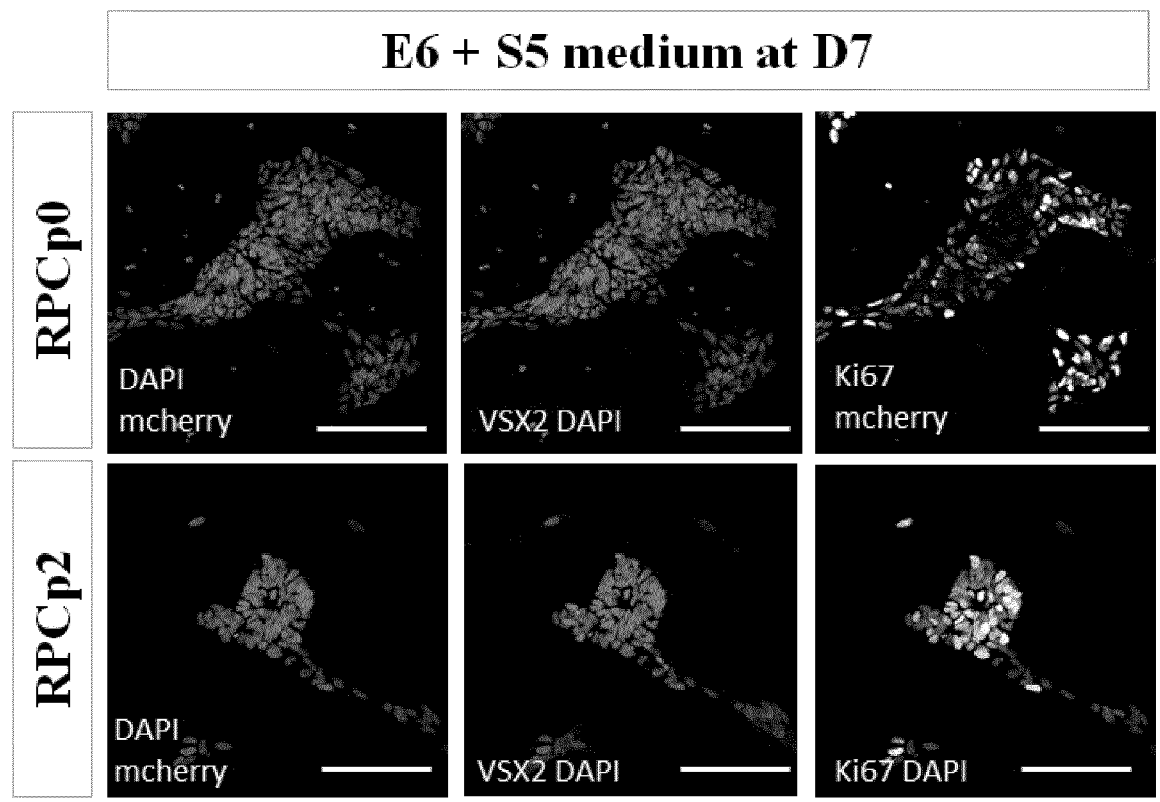

FIG. 15: Immunostaining analysis of VSX2, Ki67, mCherry between RPCp0 and p2 cultivated in E6+S5 medium.

Figure 16:
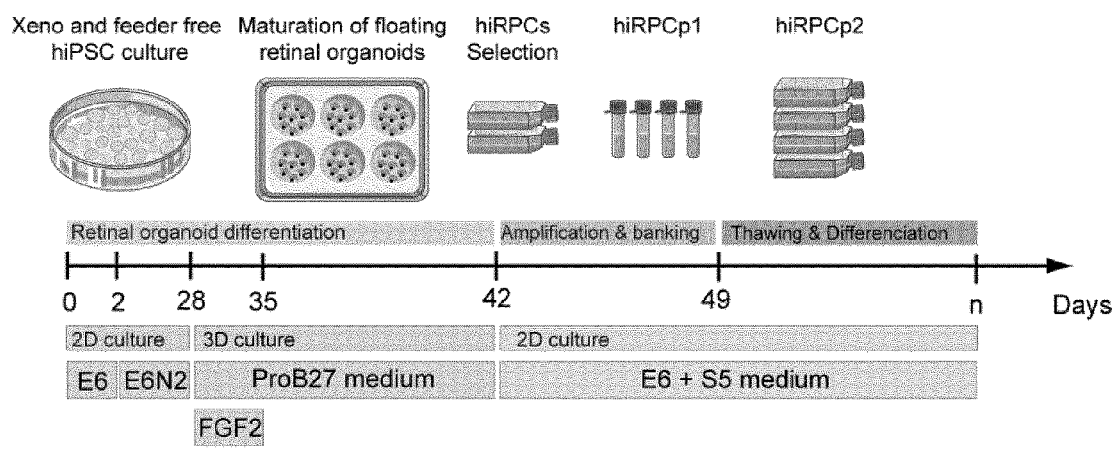

FIG. 16: Diagram showing the steps to amplify and cryopreserved RPCp1.

Figure 17:
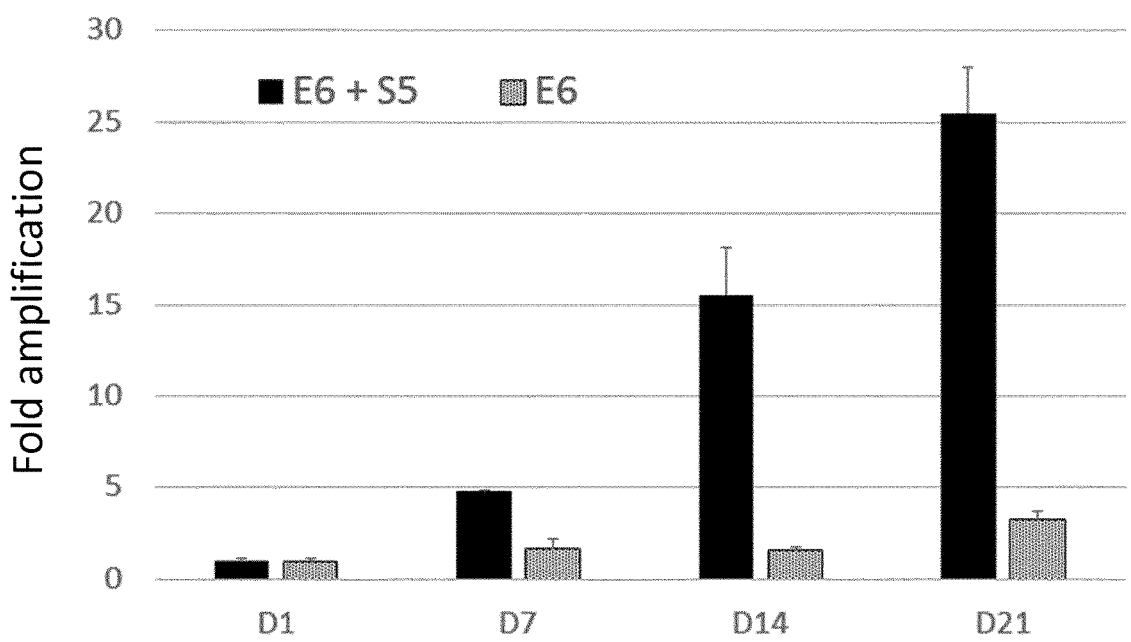

FIG. 17: Fold amplification of RPCp2 cultivated in E6 or E6+S5 media during 7, 14 or 21 days in culture.

Figure 18:
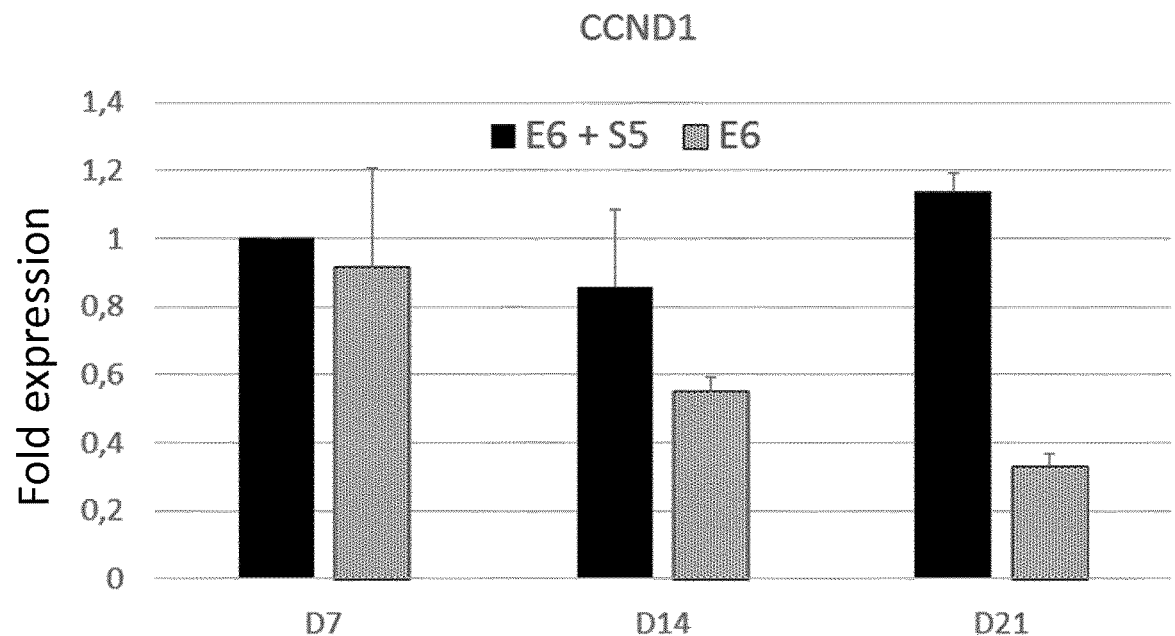

FIG. 18: Expression of CCND1 in RPCp2 cultivated in E6 or E6+S5 media.

Figure 19:
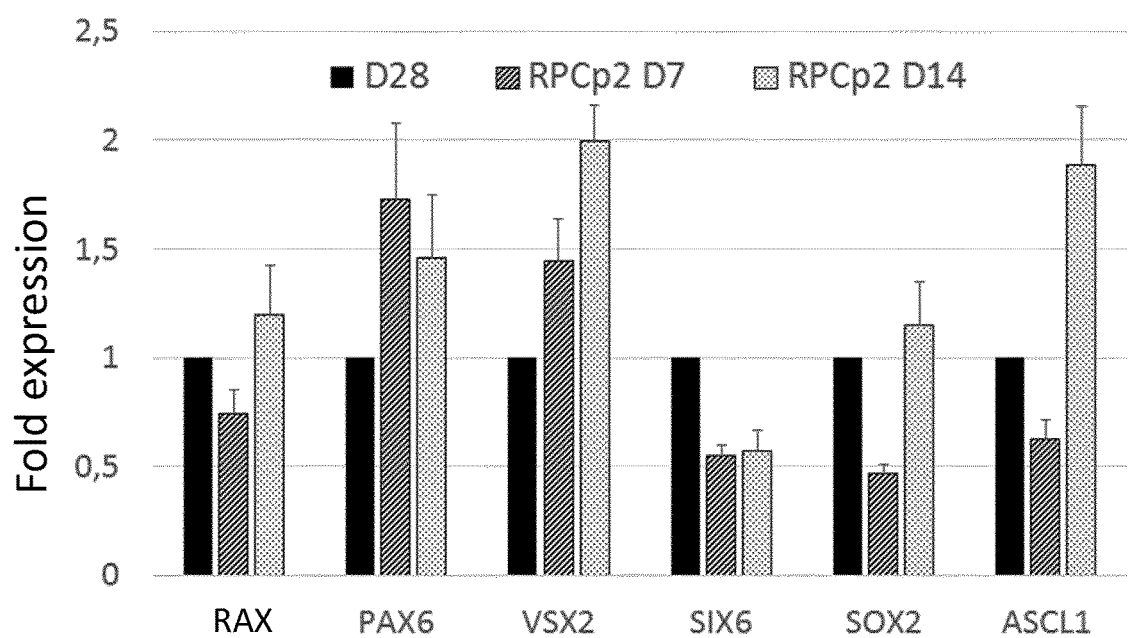

FIG. 19: Expression of RPCp2 specific genes after 7 or 14 days in culture using E6+S5 medium. Results normalized to the retinal organoids at D28.

Figure 20:
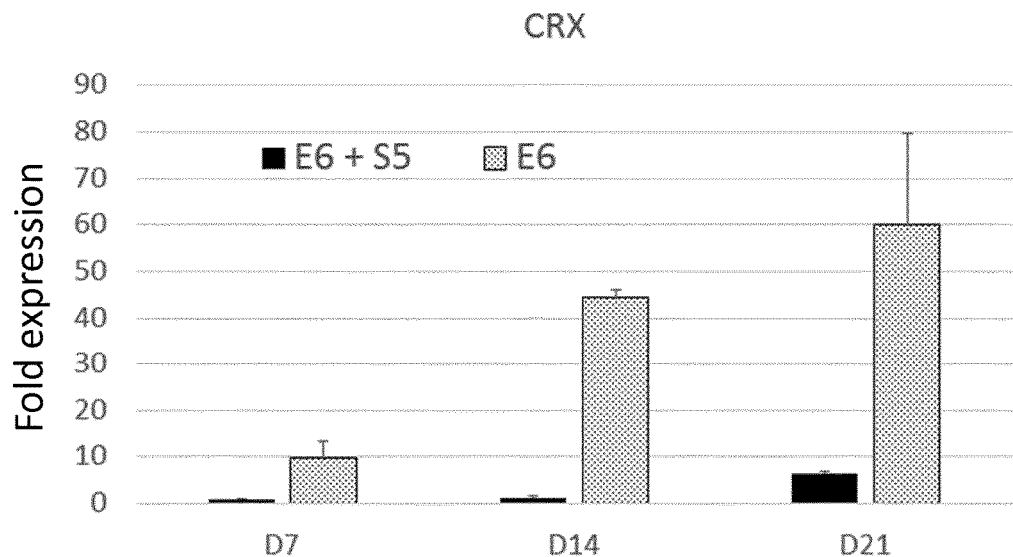

FIG. 20: Expression of the precursor of photoreceptor gene CRX after 7, 14 or 21 days in culture. Results normalized to the condition E6+S5 at D7.

Figure 21:
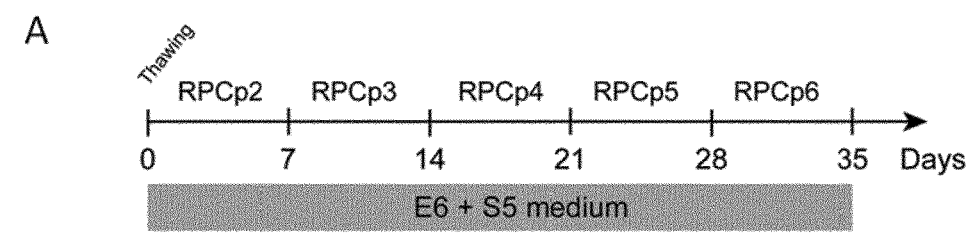
Figure 21:
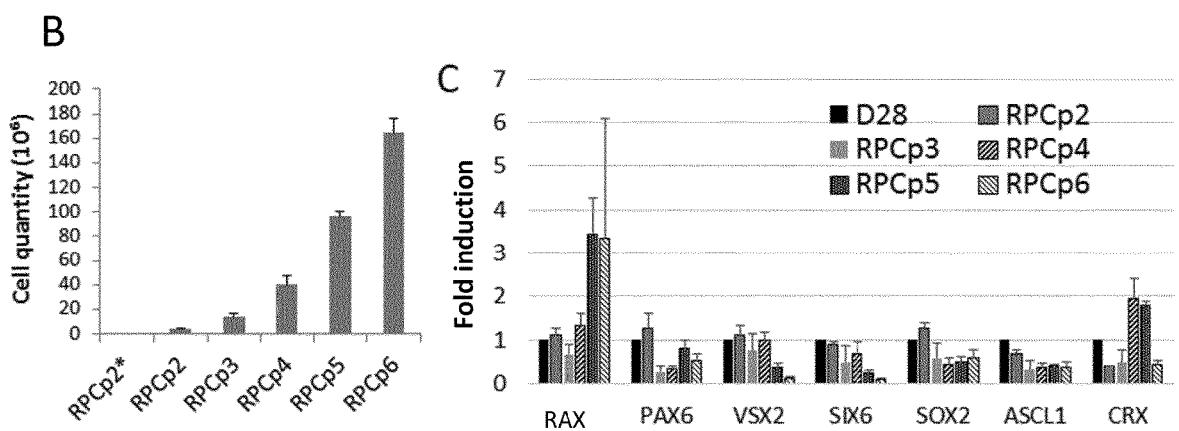

FIG. 21: RPCs characterization after amplification at different passages. (A) Schematic diagram showing the method used to determine the passage number. (B) Cell growth histogram showing the number of cells obtained at the end of each passage. RPCp2*, thawed and seeded RPC from freezed RPCp1 (mean SD, n=3). (C) qRT-PCR analysis of RPC genes and retinal progenitor markers in RPC at D7. Data are normalized to RPCs from retinal organoids at D28.

Figure 22:
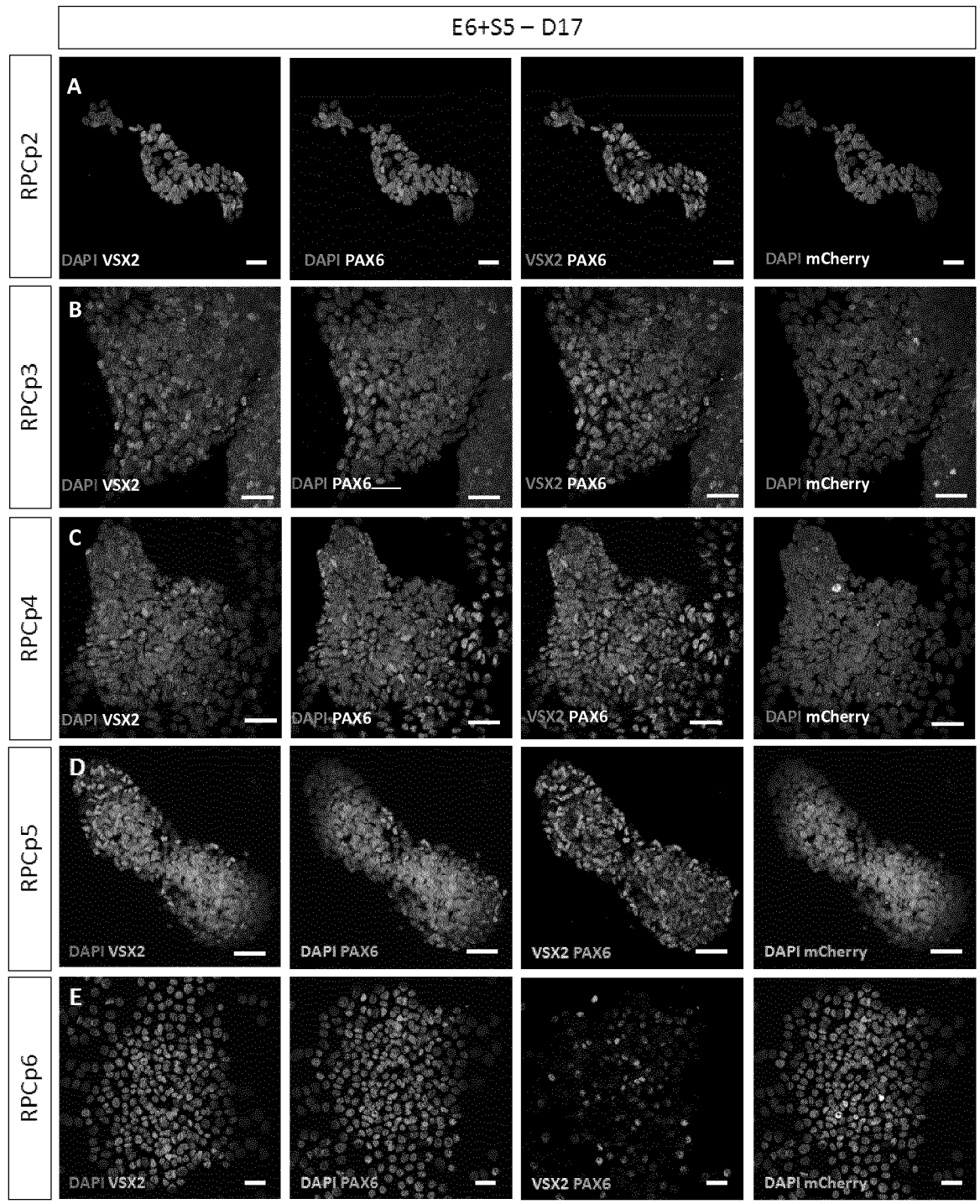

FIG. 22: Immunostaining of VSX2 and PAX6 transcription factors in RPCs after 17 days in E6+S5 medium. DAPI (nuclei), mCherry (CRX). Scale bars: 30 μm.

Figure 23:
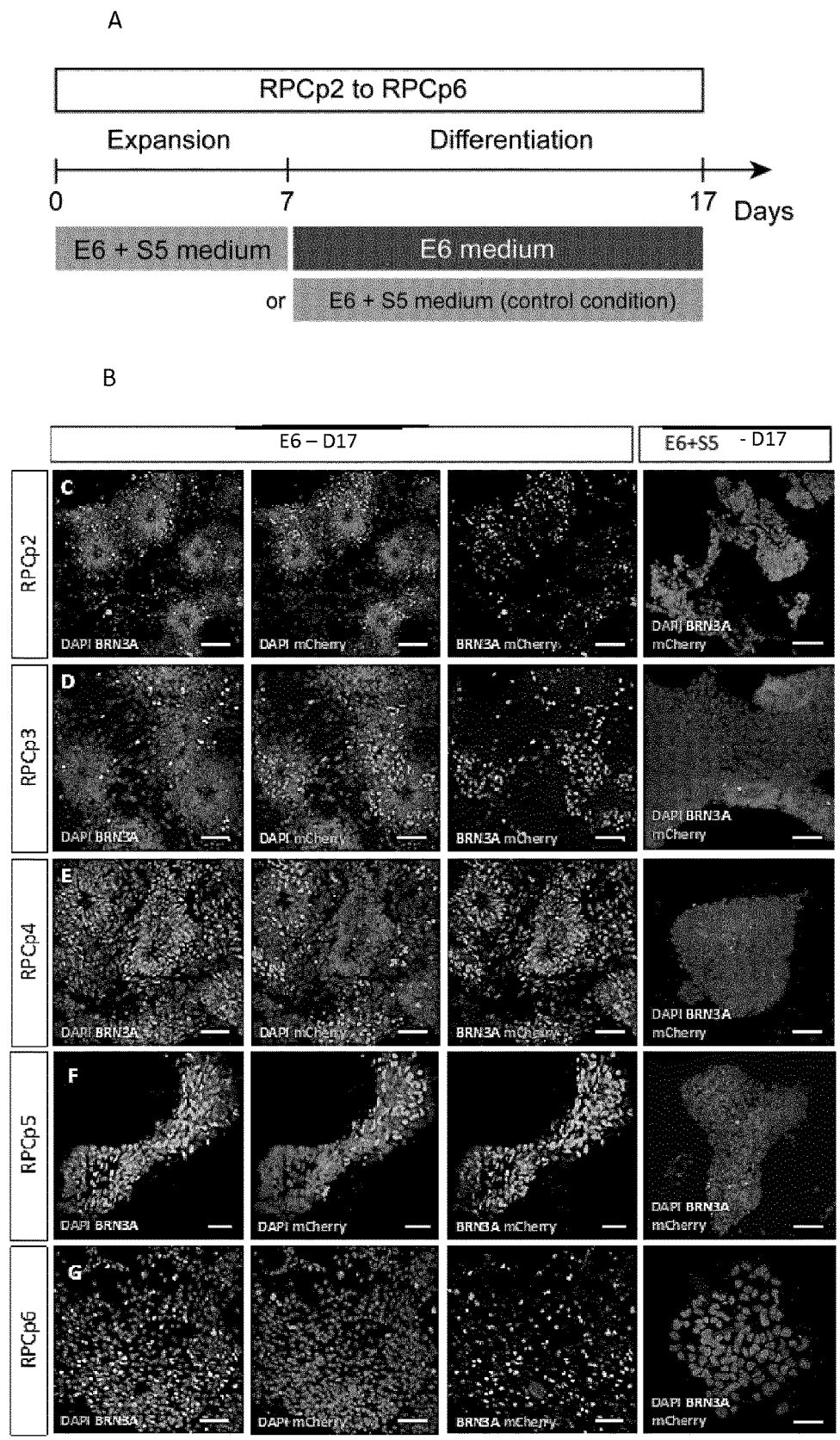

FIG. 23: Spontaneous differentiation of RPCs after 10 days in E6 medium or E6+S5 medium. (A) Schematic diagram outlining the spontaneous differentiation of RPCs. This procedure was carried out for each passage. (B) Immunohystochemistry analysis of differentiated RPCs at D17 for BRN3A and mCherry (CRX). Scale bars: 30 μm.

EXAMPLES

Example 1: A Culture Method for an Efficient Amplification of Retinal Progenitor Cells Derived from Human Pluripotent Stem Cells 1.1 Material and Methods hiPSC-Derived Retinal Organoid Production Human iPSC differentiation was based on Reichman et al., 2017 [2]. Briefly human iPSCs were expanded to 70-80% confluence in 6-cm diameter dishes coated with rhVTN-N(Thermo Fisher Scientific) in Essential 8™ medium. At this time, defined as day 0 (D0), hiPSCs were cultured in chemical defined Essential 6™ medium (Thermo Fisher Scientific). After 2 days (D2), the medium was switched to E6N2 medium composed of Essential 6™ medium, 1% CTS™ (Cell Therapy Systems) N2 supplement (Thermo Fisher Scientific), 10 units/ml Penicillin and 10 μg/ml Streptomycin (Thermo Fisher Scientific). The medium was changed every 2-3 days. On D28, identified self-formed retinal organoids were isolated, using a needle and cultured in 6-well-plates (8 to 12 organoids per well) as floating structures in the ProB27 medium supplemented with 10 ng/ml of animal-free recombinant human FGF2 (Peprotech). ProB27 medium is composed of chemical defined DMEM:Nutrient Mixture F-12 (DMEM/F12, 1:1, L-Glutamine), 1% MEM non-essential amino acids, 2% B27 supplement (Thermo Fisher Scientific), 10 units/ml Penicillin and 10 µg/ml Streptomycin. At D35, FGF2 was removed and half of the "ProB27 medium" was changed every 2-3 days for the next several weeks.

hiPS-Derived Retinal Progenitor Isolation and Culture

Retinal organoids were cultivated in floating condition in ProB27 medium and dissociated using Papain method as described in Reichman et al., 2017 [2]. Briefly, floating retinal organoids were collected at D42. Distal pigmented RPE was discarded from the structures under a stereomicroscope and retinal structures were washed 3 times in Ringer solution (NaCl 155 mM; KCl 5 mM; CaCl2 2 mM; MgCl2 1 mM; NaH$_2$PO$_4$ 2 mM; HEPES 10 mM and Glucose 10 mM). RPE-free retinal organoids were dissociated with two units of pre-activated papain at 28.7 u/mg (Worthington) in Ringer solution during 25 min at 37° C. When cells were homogeneously resuspended with up and down pipetting, then papain was deactivated by adding 1 ml of ProB27 medium. Cells were centrifuged and resuspended in pre-warmed hiRPC amplification medium named K and K+ medium. K medium is composed of ProB27 medium with CH1R99021 at 3 µM, Purmorphamine at 1 µM and ATP at 100 µM. K+ medium is K medium with FGF2 at 10 ng/ml and EGF at 100 ng/ml. About 140 structures were plated in 1 T-25 cm$^2$ dish previously coated with Geltrex® hESC-qualified Ready-To-Use Reduced Growth Factor Basement Membrane Matrix (Thermo Fisher Scientific). Dissociated cells were incubated at 37° C. in a standard 5% CO$_2$/95% air incubator and medium was changed every 2 days for the next 5 days, before immunostaining. At 80% confluence, adherent hiRPCs were passaged using TrypLE express (Thermo Fisher Scientific) and seeded at 50 000 cells/cm$^2$.

RNA Extraction and Taqman Assay

Total RNAs were extracted using Nucleospin RNA II kit (Macherey-Nagel) according to the manufacturer's protocol, and RNA yields and quality were checked with a NanoDrop spectrophotometer (Thermo Fisher Scientific). cDNA were synthesized from 250 ng of mRNA using the QuantiTect reverse transcription kit (Qiagen) following manufacturer's recommendations. Synthesized cDNA were then diluted at 1/20 in DNase-free water before performing quantitative PCR. qPCR analysis was performed on a Applied Biosystems real-time PCR machine (7500 Fast System) with custom TaqMan® Array 96-Well Fast plates and TaqMan® Gene expression Master Mix (Thermo Fisher Scientific) following manufacturer's instructions. All primers and MGB probes labeled with FAM for amplification were purchased from Thermo Fischer Scientific as described in Reichman et al., 2017 [2], ASCL1 (Assay ID Hs04187546_g1). Results were normalized against 18S and quantification of gene expression was based on the DeltaCt Method.

Immunostaining and Imaging on Adherent Retinal Progenitor Cells

Amplified or differentiated retinal cells were fixed with 4% PAF in PBS for 5 min before immunostaining. After washes with PBS, nonspecific binding sites were blocked for 1 hour at room temperature with a PBS solution containing 0.2% gelatin and 0.25% Triton X-100 (blocking buffer) and then overnight at 4° C. with the primary antibody diluted in blocking buffer as described in [2]. Cells were washed three times in PBS with 0.1% Tween and then incubated for 1 hour at room temperature with appropriate secondary antibodies conjugated with either AlexaFluor 488, 594 or 647 (Interchim) diluted at 1:600 in blocking buffer with 4',6-diamidino-2-phenylindole (DAPI) diluted at 1:1000 to counterstain nuclei. Fluorescent staining signals were captured Olympus FV1000 confocal microscope equipped with 405, 488, 543 and 633 nm lasers. Confocal images were acquired using a 1.55 or 0.46 µm step size and corresponded to the projection of 10 to 30 optical sections.

1.2 Results

Retinal Progenitors Profile in Retinal Organoids

During floating culture in ProB27 medium, retinal cells in organoids express specific transcription factors such as RAX [6], VSX2 [7], SOX2 [8], SIX6 [9], LHX2 [10] and PAX6 [11] indicating their progenitor identity or ASCL1 and VSX2 [12], reflecting their neurogenic competence. In this culture condition, we observed by qRT-PCR a pic expression of these specific markers at 42 day (D42) (FIGS. 1A and 1B).

Moreover, by Immunohistochemistry, the RPC population can be clearly identified in rosettes by the coexpression of PAX6 and ASCL1 (FIG. 2AC) and ASCL1 and VSX2 (FIG. 2B). The mitotic capacity of RPCs was confirmed by the expression of Ki67 by VSX2-positive cells in rosettes (FIG. 2C). Thus, D42 was the time chosen to isolate the hiPSC-derived RPCs (hiRPCs) from retinal organoids.

Isolation and Culture of Human hiRPCs from Retinal Organoids

At D42, organoids were dissociated using papain. Dissociated cells were plated in Geltrex coated dishes. Geltrex hESC-qualified matrix was chosen for its ability to support pluripotency of stem cell culture.

Retinal cells were cultivated in 2 distinct hiRPC amplification medium named K and K+ medium. These media were designed to maintain both proliferation property and multipotency of hiRPCs.

Culture of dissociated retinal cells (from D42-old organoids) in K medium (FIGS. 3B and 3E) or in K+ medium (FIGS. 3C and 3F) sustained proliferation compared to control condition in ProB27 medium alone (FIGS. 3A and 2D). At D10 post dissociation, K and K+ medium allow to increase by 2 or 3 fold the cell number, respectively (FIG. 4). From the first passage, the cells number can be multiply by 4 with K medium or by 8 with K+ medium in 10 days (FIG. 6). hiRPCs were cultured until passage 2 (FIG. 5) while retaining retinal differentiation capability (FIG. 9).

Analysis of Retinal Identity and Multipotency Markers in hiRPCs

Since all multipotent cells are mitotic but all mitotic cells are not necessary multipotent [13-15], the analysis of multipotency markers in expended hiRPCs was investigated. By qRT-PCR, we showed that the expression of key RPC genes such as RAX, PAX6, VSX2, SIX6, SOX2 was higher in K and K+ culture conditions compared to control. This reinforcement of RPC identity is seen by qRT-PCR as early as D1 post-dissociation and even more pronounced at D10 (FIGS. 7A and 7B) and confirmed by immunohistochemistry in FIG. 8, where the multipotency property can be identified by coexpression of specific transcription factor within the same cell. Thus, we showed that expanded hiRPCs coexpress the neurogenic marker ASCL1 and the RPC marker PAX6 and VSX2 in both K and K+ culture condition (FIGS.

8 E, F, J and I), while retaining retinal identity by the expression of RAX and LHX2 (FIGS. 8G, 8H, 8K and 8L) and proliferative marker Ki67 (FIGS. 8H and 8L).

Moreover, the expression of the transcription factor CRX, one of the earliest known photoreceptor marker, is maintained at low level in K and K+ media compared to control condition at D10 (FIG. 7C). Interestingly, isolated RPCs cultured in K or K+ conditions respectively maintain or favor the expression of VSX2 while keep down CRX expression between D1 and D10 (FIG. 7D).

Differentiation Capacity

We tested the ability of the hiRPCs expanded after two passages (hiRPCp2) in K+ medium to be differentiated in retinal neurons. Three different culture conditions were tested: 1—By a spontaneous differentiation in ProB27 medium, a control condition. 2-By an "early forced" differentiation using ProB27 medium supplemented by DAPT, a Notch pathway inhibitor, directly after K+ medium condition at D3 (Diff 1). And 3-by a "late forced" differentiation using ProB27 medium supplemented by DAPT at D3 to accelerate photoreceptor commitment as previously described [1] (FIGS. 9A and 9B). By qRT-PCR, we showed that differentiated hiRPCp2 are able to express the photoreceptor precursor marker CRX, after 10 days in culture, in control (ProB27 medium) and "Diff 2" culture conditions while CRX expression is maintained at low level in K+ culture condition (FIG. 9C). Remarkably, differentiated hiRPCs are also able to express the RGC marker BRN3A in the three differentiation conditions but preferentially in control condition allowing spontaneous differentiation. We confirmed the expression of these markers in differentiated retinal cells by immunohistochemistry (FIG. 9D). In control and "Diff 2" conditions, photoreceptor precursors can be identified by the coexpression of CRX and RECOVERIN (RCVRN) and RGCs by BRN3A.

Discussion

The inventors described here for the first time, the possibility to amplify adherent hiRPCs while keeping their multipotency. Thus with this new culture system, 30 cm² culture of human iPS cells (corresponding to three 6-cm² dishes) give until 1000 cm² of hiRPCs in 8 weeks, representing more than 300 million of multipotent retinal cells at passage 2 for banking or downstream use. This innovative approach will allow an automated large production of hiRPCs for research and therapeutic use as cell therapy or high throughput drug screening for the emergence of new treatment for vision maintenance and restoration.

Example 2: Alternative Culture Method for an Efficient Amplification of Retinal Progenitor Cells Derived from Human Pluripotent Stem Cells 2.1 Material and Methods hiPSC-Derived Retinal Organoid Production Human iPSC-derived retinal organoid are produced according to the same protocol as example 1.

Retinal Organoids Dissociation, Isolation and Culture

Retinal organoids were dissociated at D42. To that end, organoids were collected and washed 3 times in Ringer solution (NaCl 155 mM; KCl 5 mM; CaCl2 2 mM; MgCl2 1 mM; NaH$_2$PO$_4$ 2 mM; HEPES 10 mM and Glucose 10 mM). Retinal organoids were dissociated with four units of pre-acivated papain at 43.2 mgP/ml (STEMCELL™ Technologies) in activation solution (1.1 mM EDTA, 0.067 mM mercaptoethanol et 5.5 mM cysteine-HCl) during 30 min a 37° C. When cells were homogeneously resuspended with up and down pipetting, after 25 minutes of incubation, 25 µl of DNAses were added. When organoids were dissociated completely, papain was deactivated by adding 7 ml of ProB27 medium. Cells were centrifuged 3 minutes at 120 g and resuspended in E6+S5 medium (FIG. 10).

RPC at passage 0 (RPCp0) were obtained after dissociation of retinal organoids at D42. These cells were cultured in 24-well plates or in T-25 cm² dish previously coated with Geltrex® (Thermo Fisher Scientific). The seeding of the retinal cells after dissociation was carried out at a density of 3×10⁵ Cell per cm². After 7 days of cultivation a passage was made. To that end, 2 nil of TripLE (Thermo fisher scientific) was applied to the cells cultured in T-25 cm² dish for 6 minutes at room temperature. The reaction was stopped by adding 4 mL of ProB27 medium. After this step, a cell count was carried out. The passage from RPCp0 to p1 was made at a density of 5×10⁵ cells/cm² and seeded in T-25 cm² dish previously coated with Geltrex®. RPCp1 contained in T-25 cm² dish were cultured for 7 days in E6+S5 medium. The environment was changed every two days. At D7, RPCp1 underwent a passage using the TripLE to give retinal progenitors passage 2 (RPCp2) as described above. RPCp2 was seeded into −25 cm² dish or 24-well plates previously coated with Geltrex®.

RNA Extraction and qRT-PCR

Total RNAs were extracted and cDNA were synthesized according to the same protocol as example 1.

Immunostaining and Imaging

The cells grown were fixed with paraformaldehyde (PFA) at 4° C. for 10 minutes before being washed four times in PBS. Nonspecific binding sites were blocked for 1 hour at room temperature with a PBS solution containing 0.2% gelatin and 0.25% Triton X-100 (blocking buffer) and then incubated with primary antibodies (Table 4) diluted in blocking buffer for 1 hour at room temperature or overnight at 4° C. The cells were washed four times in PBS with 0.1% Tween and then incubated for 1 hour at room temperature with appropriate secondary antibodies conjugated with either AlexaFluor 488, 594 or 647 (ThermoFisher Scientific) diluted at 1:500 in blocking buffer. It is noted that the red color comes from the expression of the trangene CrxP-mCherry. The cells were washed twice in PBS with 0.1% Tween and then incubated in DAPI diluted at 1:1000 with PBS with 0.1% Tween. Finally, the coverlips have been rinsed in PBS 1× before being placed on a slide of the fluoromount-G (Southern biotech). Fluorescent staining signals were captured Olympus FV1000 confocal microscope equipped with 488, 559 and 647 nm lasers.

TABLE 4

Different primary antibodies used

| Antigen | Species | Dilution | Source |
| --- | --- | --- | --- |
| Ki67 | Mouse | 1/100 | BD Pharma |
| VSX2 | Goat | 1/200 | Santa Cruz Technologies |
| ASCL1 | Mouse | 1/200 | Pharmigen |
| PAX6 | Mouse | 1/1000 | DSHB |
| RAX | Rabbit | 1/10000 | Abcam |
| SOX2 | Goat | 1/200 | Santa Cruz Technologies |
| OTX2 | Rabbit | 1/5000 | Millipore |
| BRN3A | Mouse | 1/250 | Millipore |

2.2 Results

Analysis of Multipotency Maintenance of Retinal Organoids

The expressions of RPC specific genes were stable during the expansion of RPCp0 (FIG. 11).

Organoids at D42 express CRX higher than the structure at D28 (FIG. 12). Nevertheless, after dissociation, the expression of CRX (photoreceptors precursor marker) in RPCp0 decreases showing the enrichment of multipotent cells which do not express CRX in the culture (FIG. 12).

Initially, in organoids at D42, some cells are entering in differentiation expressing low level of CRX. After dissociation and plating cells, at Day 1 (D1) a low proportion of cell are engaged in differentiation, but after 8 days in E6+S5 medium, RPCs become the major cell type, explaining why the CRX expression is decreased in RPCp0 between D1 and D8.

Selection of RPC

At D7, the expended RPCp0 using E6+S5 express VSX2, PAX6 and ASCL1 but not CRX (showed by the absence of mcherry expression). RPCp0 were in the mitotic state, as showed by the Ki67 expression. However, cells cultivated in ProB27, a maturation medium, show the expression of CRX (FIG. 13).

Amplification of RPC

Multipotency maintenance of RPCp2 versus RPCp0 was analyzed by RT-qPCR at D7 (FIG. 14). During passages in E6+S5 medium, RPCp2 express specific RPC genes, maintaining multipotency. CRX expression is kept at basal level.

These observations were confirmed by immunostaining analysis (FIG. 15).

Example 3: RPC Cryopreservation

3.1 Material and Methods

RPCs were obtained from hiPSCs-Derived Retinal Organoids as described above. At D42, floating retinal organoids were dissociated and amplified in E6+S5 medium. After 1 week, cells were cryopreserved for cell banking at passage 1 (RPCp1). Cells used in this study were thawed and plated at passage 2 (RPCp2) at $5 \times 10^4$ cells/cm2 either in T-25 cm2 dishes or in 24-multiwell plates (Corning Costar) with glass coverslips precoated by Geltrex (ThermoFisher). At this time, defined as day 0 (D0), RPCs were cultured in chemical defined E6+S5 medium (FIG. 16).

3.2 Results

Growth Test of RPCp2 Thawed

In 3 weeks the number of cells was multiplied by 25.4 using E6+S5 medium (FIG. 17). Using E6 medium, the cells were multiplied by 3.2 only (FIG. 17).

This observation was confirmed by the analyses of the expression of the major cyclin in retinal development, the Cyclin D1 (CCND1), involved in cell cycle of RPCs ([17]; [18]; [19]). Cyclin D1 maintain RPC proliferation ([20]; [21]). In fact, in E6+S5 medium, RPC keep a stable expression of CCND1 while in E6 culture condition its expression decrease (FIG. 18). Thus, the combination of the 5 molecules maintains the mitotic ability of RPCs thought CCND1 expression.

Multipotency Maintenance of RPCp2 Thawed

Culture of RPCp2 (from RPCp1 cryopreserved and thawed) in E6+S5 medium during 14 days maintains the expression of the key RPC genes RAX, PAX6, VSX2, SIX6 but also SOX2 (stem marker) and ASCL1 (neurogenic potential marker) (FIG. 19). Moreover, the analysis of CRX expression in RPCs cultivated in E6 media show clearly that the multipotent cells commits in photoreceptor precursors ways using E6 by the increase of CRX expression (FIG. 20). In parallel, using E6+S5 culture condition, the expression of CRX is maintained at low level (FIG. 20).

Example 4: Production of Retinal Progenitor Cells and Determination of the Passage Limit

4.1 Material and Methods

RPCs were obtained from hiPSCs-Derived Retinal Organoids as described above and cells are prepared as described in example 3.

Cell Passaging

The passage number was determined by performing consecutive passages each week (FIG. 21A). After 1 week, RPCp2 are passed giving the new cell population RPCp3. The same procedure is applied for all following passages.

RNA Extraction and qRT-PCR

Total RNAs were extracted and cDNA were synthesized according to the same protocol as example 1.

Immunostaining and Imaging

The cells grown were fixed by adding 4% paraformaldehyde (pH 7.4) and are left 10 min on ice. Paraformaldehyde solution is removed, and cells are washed two times with 500 µl of PBS. Then, 300 µl of blocking buffer (PBS+0.2% Gelatine+0.25% Triton X-100) are added. After 60 min of incubation at room temperature, blocking buffer is discarded. The desired concentration of primary antibodies diluted in 300 µl of blocking buffer is added to each well (table 5). Extra wells for controls are used in which primary antibody solution is not added. After 1 hour of incubation at room temperature, primary antibody solution is removed, and cells are washed four times for 5 minutes with 500 µl of PBS. Then, the desired concentration of fluorescent dye-labelled secondary antibody along with DAPI or Hoechst (1/1000 dilution) is added to all wells. Cells are incubated 1 hour at room temperature protected from light. Secondary antibody solution is removed, and cells are washed three times for 5 minutes with 500 µl of PBS with 0.1% Tween and two times for 5 minutes with PBS. One drop of Southern biotech Fluoromount G is placed on a slide. The coverslip is gently removed from the bottom of the well with a needle and tweezers. The edges are dried by tapping on paper towels. The coverslip is then placed in the centre of the Southern Biotech Fluoromount G drop on the side containing the cells. The slide/coverslip assembly is left at room temperature to dry and is then stored at 4° C. temporarily. It is stored for a longer period at −20° C.

TABLE 5

Different primary antibodies used

| Antigen | Species | Dilution | Source |
| --- | --- | --- | --- |
| Ki67 | Mouse | 1:200 | BD Pharma |
| PAX6 | Rabbit | 1:2000 | Merck Millipore |
| BRN3A | Mouse | 1:250 | Merck Millipore |
| VSX2 | Goat | 1:200 | Santa Cruz Technologies |

4.2 Results

The results show that the cells cultivated and passed several times are still able to multiply up to the RPCp7 stage.

By seeding 1 million thawed cells of RPCp2, 4.26 million RPCp2 are obtained after 7 days of culture (FIG. 21 B).

Their multipotent and mitotic property is then confirmed by a RT-qPCR analysis (FIG. 21 C), indicating the relative expression of RPC-specific genes (RAX, VSX2, SIX6, SOX2, ASCL1, PAX6) and of a photoreceptor precursor marker (CRX). From the stage RPCp2 to RPCp4, the expression of RAX, VSX2 and SIX6 remains stable and comparable to native RPCs at D28 described previously (FIG. 21 C). These results suggest that the expression of RPCs specific genes is stable at least until the passage 4. Although, RPCs specific genes as VSX2 or SIX6 decrease after p4 (FIG. 21 A), the multipotent cells growth continuously until p6 (FIG. 21 B) and are able to differentiate into CRX positif-cells (FIG. 23 B).

The expression analysis was confirmed by immunostaining (FIG. 22).

Although, RPCs express key genes showing their multipotent state, we tested their ability to differentiate in PRs and RGCs by spontaneous differentiation in medium (E6) deprived of the cocktail molecules maintaining multipotency. Thus, after 7 days in E6+S5 medium for cell expansion, RPCs were shifted in E6 medium for 10 days and compared to cells still cultured in E6+S5 (FIG. 23 A).

By immunostaining, we confirm that the RPCs at passage 2 to 6 are able to differentiate in the photoreceptor precursor (mCherry, CRX) and in retinal ganglion cells ways (BRN3A). Interestingly, at D17, RPCs cultivated in E6+S5 were not differentiated (FIG. 23 B).

REFERENCES

1. Reichman S, Terray A, Slembrouck A, et al. (2014) From confluent human iPS cells to self-forming neural retina and retinal pigmented epithelium. Proc Natl Acad Sci USA 111:8518-23. doi: 10.1073/pnas.1324212111
2. Reichman S, Slembrouck A, Gagliardi G, et al. (2017) Generation of Storable Retinal Organoids and Retinal Pigmented Epithelium from Adherent Human iPS Cells in Xeno-Free and Feeder-Free Conditions. Stem Cells 35:1176-1188. doi: 10.1002/stem.2586
3. Brewer G J, Torricelli J R, Evege E K, Price P J (1993) Optimized survival of hippocampal neurons in B27-supplemented neurobasal?, a new serum-free medium combination. J Neurosci Res 35:567-576. doi: 10.1002/jnr.490350513
4. Choudhry Z, Rikani A A, Choudhry A M, et al. (2014) Sonic hedgehog signalling pathway: a complex network. Ann Neurosci 21:28-31. doi: 10.5214/ans.0972.7531.210109
5. Schaffer B, Wiedau-Pazos M, Geschwind D H (2003) Gene structure and alternative splicing of glycogen synthase kinase 3 beta (GSK-3beta) in neural and non-neural tissues. Gene 302:73-81.
6. Mathers P H, Grinberg A, Mahon K A, Jamrich M (1997) The Rx homeobox gene is essential for vertebrate eye development. Nature 387:603-607. doi: 10.1038/42475
7. Burmeister M, Novak J, Liang M-Y, et al. (1996) Ocular retardation mouse caused by Chx10 homeobox null allele: impaired retinal progenitor proliferation and bipolar cell differentiation. Nat Genet 12:376-384. doi: 10.1038/ng0496-376
8. Taranova O V., Magness S T, Fagan B M, et al. (2006) SOX2 is a dose-dependent regulator of retinal neural progenitor competence. Genes Dev 20:1187-1202. doi: 10.1101/gad.1407906
9. Li X, Perissi V, Liu F, et al. (2002) Tissue-specific regulation of retinal and pituitary precursor cell proliferation. Science 297:1180-3. doi: 10.1126/science.1073263
10. Gordon P J, Yun S, Clark A M, et al. (2013) Lhx2 balances progenitor maintenance with neurogenic output and promotes competence state progression in the developing retina. J Neurosci 33:12197-207. doi: 10.1523/JNEUROSCI.1494-13.2013
11. Baümer N, Marquardt T, Stoykova A, et al. (2002) Pax6 is required for establishing naso-temporal and dorsal characteristics of the optic vesicle. Development 129: 4535-45.
12. Wright L S, Pinilla I, Saha J, et al. (2015) VSX2 and ASCL1 Are Indicators of Neurogenic Competence in Human Retinal Progenitor Cultures. PLoS One 10:e0135830. doi: 10.1371/journal.pone.0135830
13. Mansergh F C, Vawda R, Millington-Ward S, et al. (2010) Loss of photoreceptor potential from retinal progenitor cell cultures, despite improvements in survival. Exp Eye Res 91:500-12. doi: 10.1016/j.exer.2010.07.003
14. Czekaj M, Haas J, Gebhardt M, et al. (2012) In vitro expanded stem cells from the developing retina fail to generate photoreceptors but differentiate into myelinating oligodendrocytes. PLoS One 7:e41798. doi: 10.1371/journal.pone.0041798
15. Ringuette R, Wang Y, Atkins M, et al. (2016) Combinatorial Hedgehog and Mitogen Signaling Promotes the In Vitro Expansion but Not Retinal Differentiation Potential of Retinal Progenitor Cells. 43-54. doi: 10.1167/iovs.13-12592
16. Gagliardi et al., (2018) Characterization and Transplantation of CD73-Positive Photoreceptors Isolated from Human iPSC-Derived Retinal Organoids. Stem Cell Reports, 11, 665-680. https://doi.org/10.1016/j.stemcr.2018.07.005.
17. Barton et al., (2008) "Expression Patterns and Cell Cycle Profiles of PCNA, MCM6, Cyclin D1, Cyclin A2, Cyclin B1, and Phosphorylated Histone H3 in the Developing Mouse Retina."*Developmental Dynamics: An Official Publication of the American Association of Anatomists* 237(3):672-82.
18. Dyer and Cepko (2001) "Regulating Proliferation during Retinal Development." *Nature Reviews. Neuroscience* 2(5):333-42.
19. Sicinski et al., (1995) "Cyclin D1 Provides a Link between Development and Oncogenesis in the Retina and Breast." Cell 82(4):621-30.
20. Das et al., (2009) "Cyclin D1 Fine-Tunes the Neurogenic Output of Embryonic Retinal Progenitor Cells." *Neural Development* 4(May):15.
21. Fantl et al., (1995) "Mice Lacking Cyclin D1 Are Small and Show Defects in Eye and Mammary Gland Development." *Genes & Development* 9(19):2364-72.

The invention claimed is:

1. A defined cell culture medium for the expansion of human retinal progenitors while maintaining their multipotency, comprising a nutrient medium, a SHH-pathway activator, a GSK3 inhibitor, FGF2, EGF, and ATP, wherein the defined cell culture medium is devoid of DAPT.

2. The defined cell culture medium of claim 1, further comprising a pro-neural supplement, wherein the pro-neural supplement comprises insulin and transferrin.

3. The defined cell culture medium of claim 2, wherein the pro-neural supplement comprises:
 (a) BSA, transferrin, insulin, progesterone, putrescine, sodium selenite, biotin, l-carnitine, cortisone or hydrocortisone, ethanolamine, d(+)galactose, glutathione (reduced), linolenic acid, linoleic acid, retinyl acetate, selenium, T3 (triodo-1-thryonine), dl-α-tocopherol (vitamin E), dl-α-tocopherol acetate, catalase, and superoxide dismutase;
(b) transferrin, insulin, progesterone, putrescine, and sodium selenite;
(c) BSA, transferrin, and insulin; or
(d) transferrin, insulin and sodium selenite.

4. The defined cell culture medium of claim 1, wherein the SHH-pathway activator is selected from the group consisting of purmorphamine, SHH, smoothened agonist, Hh-Ag 1.5, and zinc finger protein Gli-2.

5. The defined cell culture medium of claim 4, wherein the SHH-pathway activator comprises purmorphamine, at a concentration between 1 nM and 3 µM.

6. The defined cell culture medium of claim 1, wherein the GSK3 inhibitor is selected from the group consisting of SB-216763, SB-415286, CHIR-98023, CHIR99021, AR-A014418, L803 peptide or its myristoylated form L803-mts, and LiCL.

7. The defined cell culture medium of claim 6, wherein the GSK3 inhibitor is CHIR99021 at a concentration between 2 µM and 10 µM.

8. Cryopreserved retinal progenitor cells (RPCs) in the cell culture medium as defined in claim 1 with DMSO.

9. A method of expanding retinal progenitors, comprising culturing the retinal progenitors in a defined cell culture medium as defined in claim 1.

10. An in vitro method for expanding retinal progenitors, comprising:
(i) placing a culture of human retinal progenitors in a defined cell culture medium as defined in claim 1; and
(ii) culturing the cells in said defined cell culture medium.

11. The method according to claim 10 wherein the culture in step (i) and (ii) is adherent.

12. The method according to claim 10, wherein the retinal progenitors are passaged at least once.

13. The method according to claim 10, wherein the cells obtained in step (ii) have retained their retinal multipotency property.

14. A method for obtaining photoreceptors or precursors thereof, wherein said method comprises the steps of:
(i) placing a culture of human retinal progenitors in a defined cell culture medium as defined in claim 1;
(ii) culturing the cells in said defined cell culture medium; and
(iii) culturing the cells obtained in step (ii) in a pro-neural medium.

15. A method for obtaining retinal ganglion cells, wherein said method comprises the steps of:
(i) placing a culture of human retinal progenitors in a defined cell culture medium as defined in claim 1;
(ii) culturing the cells in said defined cell culture medium;
(iii) culturing the cells obtained in step (ii) in a pro-neural medium; and
(iv) culturing the cells obtained in step (iii) in a pro-neural medium further comprising DAPT.

* * * * *